United States Patent
Subbiah et al.

(10) Patent No.: US 11,283,716 B2
(45) Date of Patent: *Mar. 22, 2022

(54) ASYMMETRIC LOGICAL UNIT ACCESS PATH DISTRIBUTION SYSTEM

(71) Applicant: Dell Products L.P., Round Rock, TX (US)

(72) Inventors: Ramesh Kumar Subbiah, Tamil Nadu (IN); Vibin Varghese, Tamil Nadu (IN)

(73) Assignee: Dell Products L.P., Round Rock, TX (US)

(*) Notice: Subject to any disclaimer, the term of this patent is extended or adjusted under 35 U.S.C. 154(b) by 115 days.

This patent is subject to a terminal disclaimer.

(21) Appl. No.: 16/715,001

(22) Filed: Dec. 16, 2019

(65) Prior Publication Data

US 2021/0126862 A1    Apr. 29, 2021

Related U.S. Application Data

(63) Continuation-in-part of application No. 16/664,493, filed on Oct. 25, 2019, now Pat. No. 11,093,147.

(51) Int. Cl.
| | | |
|---|---|---|
| *G06F 3/06* | (2006.01) | |
| *H04L 45/745* | (2022.01) | |
| *H04L 67/1097* | (2022.01) | |
| *H04L 45/02* | (2022.01) | |
| *H04L 43/02* | (2022.01) | |

(52) U.S. Cl.
CPC ............ *H04L 45/745* (2013.01); *H04L 43/02* (2013.01); *H04L 45/02* (2013.01); *H04L 67/1097* (2013.01)

(58) Field of Classification Search
CPC ...... G06F 3/0635; G06F 3/0604; G06F 3/067; H04W 4/80
USPC ......................................................... 711/154
See application file for complete search history.

(56) References Cited

U.S. PATENT DOCUMENTS

| | | | | |
|---|---|---|---|---|
| 2013/0246705 A1* | 9/2013 | Diare | .................. | G06F 11/3433 |
| | | | | 711/114 |
| 2014/0229638 A1* | 8/2014 | Zhou | ..................... | G06F 3/0635 |
| | | | | 710/38 |
| 2019/0310925 A1* | 10/2019 | Yoshida | ................ | G06F 3/0614 |
| 2020/0026623 A1* | 1/2020 | Dillaman | ............ | G06F 11/3034 |

* cited by examiner

*Primary Examiner* — Gautam Sain
(74) *Attorney, Agent, or Firm* — Joseph Mencher

(57) ABSTRACT

An ALUA path distribution system includes host devices coupled to storage subsystems by aggregated networking devices. A first aggregated networking device snoops communications between the host devices and the storage subsystems to identify first snooped information, receives second snooped information identified by a second aggregated networking device, and uses the snooped information to build a path distribution table identifying each active-optimized path provided by the aggregated networking devices between the host devices and respective LUNs on the storage subsystems. The first aggregated networking device then determines that a first active-optimized path that it provides should be redistributed to the second aggregated networking device and, in response, causes a first host device that utilizes the first active-optimized path to communicate with a first storage subsystem to remap a first LUN accessed via the first active-optimized path such that that first active-optimized path is provided by the second aggregated networking device.

20 Claims, 17 Drawing Sheets

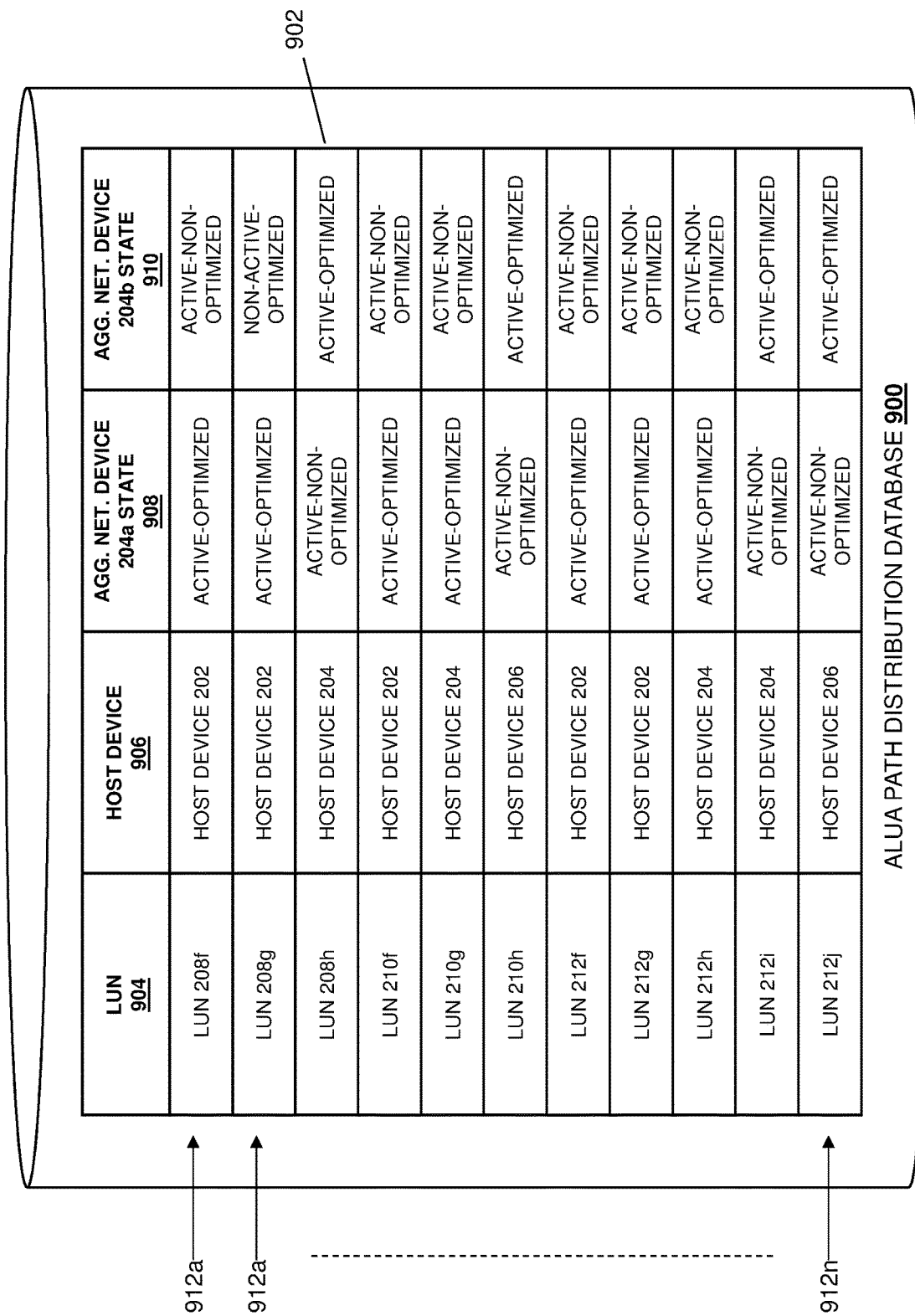

ASYMMETRIC LOGICAL UNIT ACCESS PATH DISTRIBUTION SYSTEM

RELATED APPLICATIONS

The present disclosure is a continuation-in-part of U.S. patent application Ser. No. 16/664,493, filed on Oct. 25, 2019, the disclosure of which is incorporated by reference herein in its entirety.

BACKGROUND

The present disclosure relates generally to information handling systems, and more particularly to distributing paths via information handling systems provided in Asymmetrical Logical Unit Access (ALUA) configurations.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may sometimes be provided in an Asymmetrical Logical Unit Access (ALUA) configuration in order to provide an ALUA system. For example, an ALUA system may include host devices that are coupled via aggregated networking devices to storage subsystems that each include multiple storage controllers, with each storage controller mapped to one or more logical units in its storage subsystem that are identified by respective Logical Unit Numbers (LUNs). As will be appreciated by one of skill in the art in possession of the present disclosure, such ALUA systems allows each host device to identify any particular LUN that is available via the storage controllers in a storage subsystem as "active", but with only one of those storage controllers "owning" that LUN. This results in an "active-optimized" path being available via one of the aggregated networking devices to any particular LUN, with that active-optimized path providing a direct path to the storage controller that owns that LUN, and an "active-non-optimized path" via one of the aggregated networking devices to that LUN, with that active-non-optimized path providing a path to a storage controller that does not own that LUN, but that has an indirect path to the storage controller that owns that LUN via an interconnect bus between those storage controllers.

However, it has been found that conventional techniques for balancing LUNs between storage controllers in a storage subsystem included in such ALUA systems may result in an uneven distribution of active-optimized paths and active-non-optimized paths between the aggregated networking devices. Furthermore, even when such active-optimized/active-non-optimized path distribution is initially (or substantially) even between the aggregated networking devices, the operation of the host devices, aggregated networking devices, and/or storage subsystems may result in the modification of active-optimized paths and active-non-optimized paths to provide an uneven active-optimized/active-non-optimized path distribution between the aggregated networking devices. As such, aggregated networking devices in ALUA systems may be utilized inefficiently, with one of the aggregated networking devices performing an inordinate amount of data transmission operations on the active-optimized paths it provides (as compared to the other aggregated networking device(s) in the ALUA system.)

Accordingly, it would be desirable to provide an ALUA path distribution system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a path distribution engine that is configured to: snoop communications between a plurality of host devices and a plurality of storage subsystems to identify first snooped information; receive, from a management server device that is coupled to the processing system, second snooped information identified by an aggregated networking device that is coupled to the processing system; build, using the first snooped information and the second snooped information, a path distribution table that identifies: each active-optimized path provided by the processing system and the second aggregated networking device between one of the plurality of host devices and respective Logical Unit Numbers (LUNs) included on the plurality of storage subsystems; and determine, using the path distribution table, that a first active-optimized path should be redistributed from being provided by the processing system to the being provided by aggregated networking device and, in response, cause a first host device that utilizes the first active-optimized path to communicate with a first storage subsystem to remap a first LUN accessed via the first active-optimized path such that that first active optimized path is provided by the aggregated networking device.

BRIEF DESCRIPTION OF THE DRAWINGS

FIG. 9 is a schematic view illustrating an embodiment of a database that may be provided in the aggregated networking device of FIG. 3 in the ALUA path distribution system of FIG. 2 during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
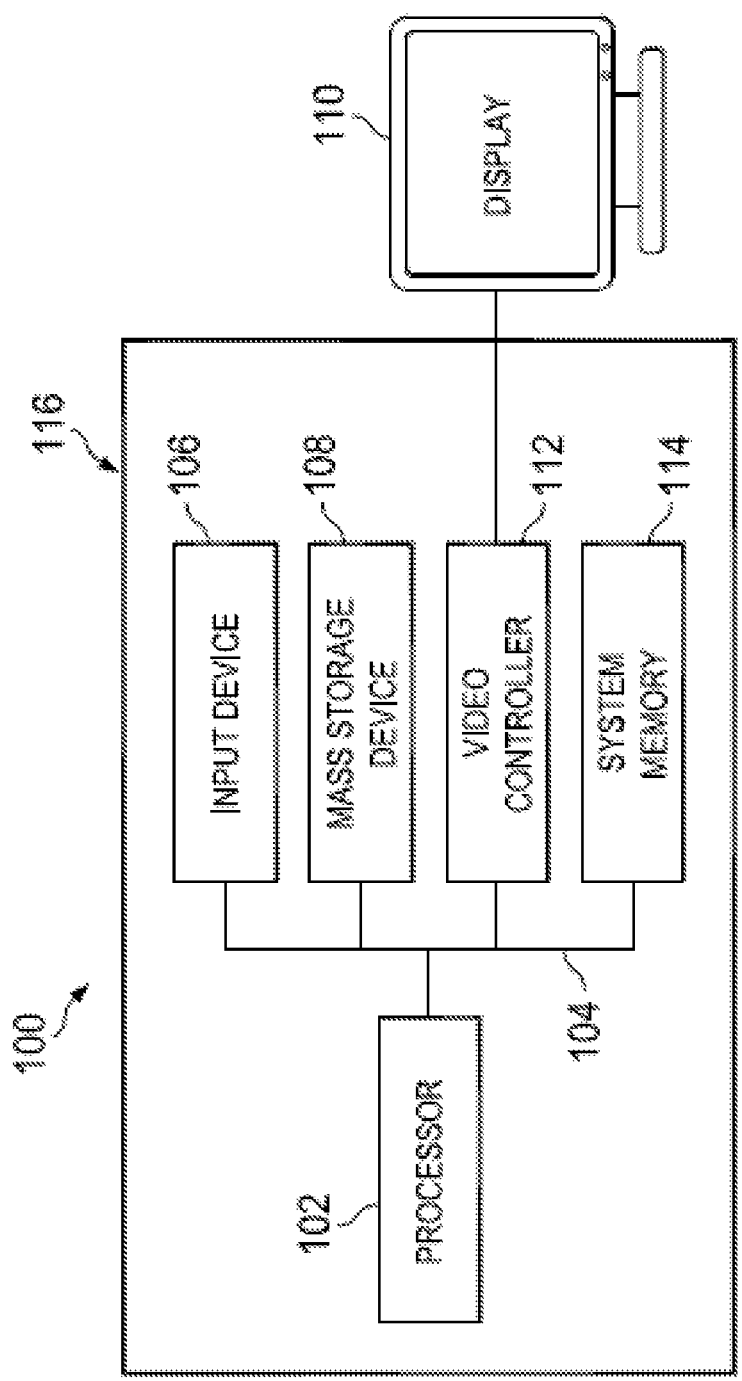
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
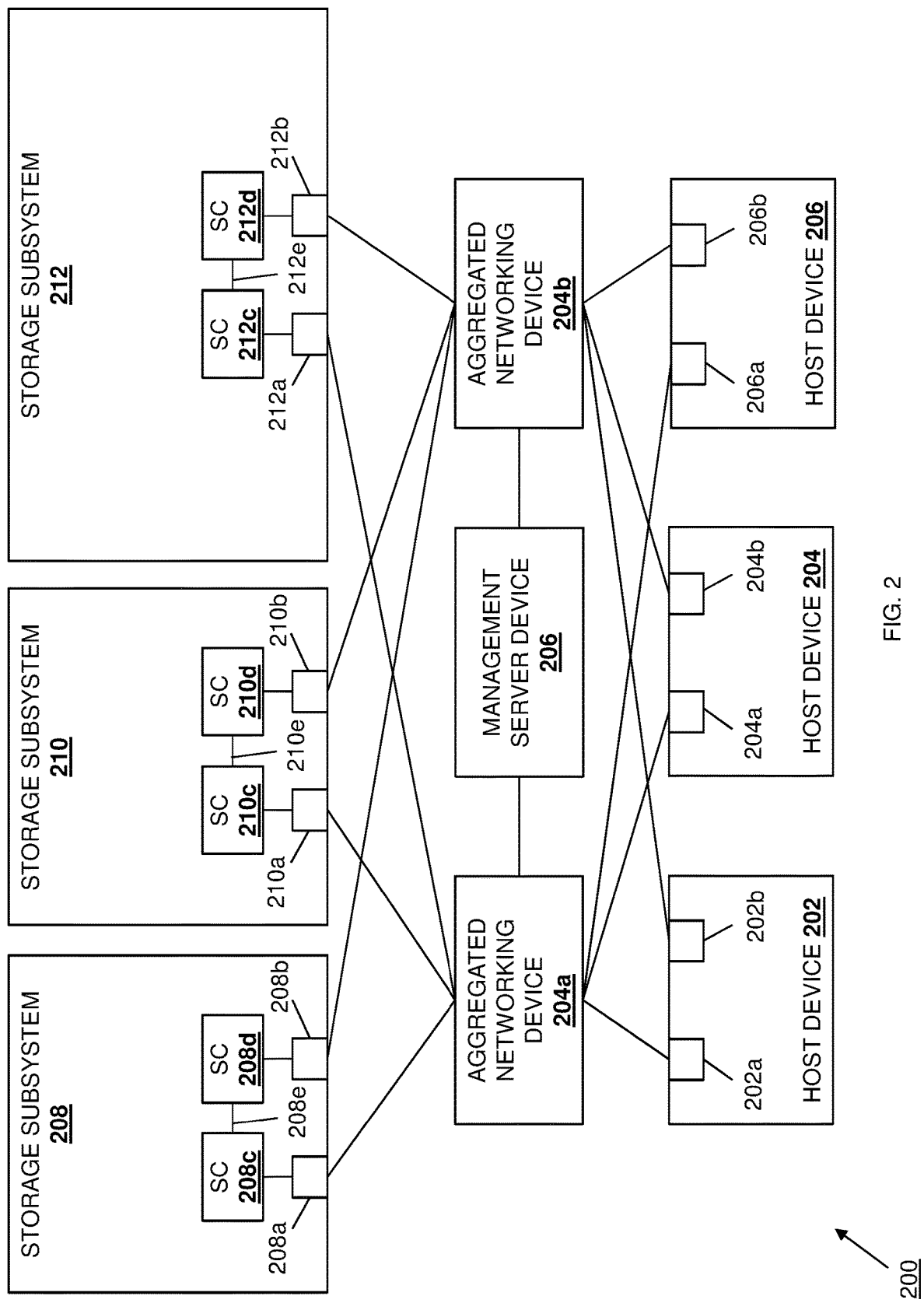
FIG. 2 is a schematic view illustrating an embodiment of an ALUA path distribution system.

Referring now to FIG. 2, an embodiment of an Asymmetric Logical Unit Access (ALUA) path distribution system 200 is illustrated. As would be appreciated by one of skill in the art in possession of the present disclosure, ALUA (also referred to as Target Port Groups Support (TPGS)) may operate to define path prioritization between host devices and storage subsystems by formally describing storage subsystem port status and access characteristics in a manner that defines how multipath Input/Output (10) should be managed between the host device and the storage subsystems. However, while illustrated and described as an ALUA system, one of skill in the art in possession of the present disclosure will recognize that the concepts described herein may be applied to other types of systems while remaining within the scope of the present disclosure as well. In an embodiment, the ALUA path distribution system 200 incudes a plurality of host devices such as the host devices 202, 204, and 206 illustrated in FIG. 2. Any or all of the host devices 202-206 may be provided by the IHS 100 discussed above with reference to FIG. 1, and/or may include some or all of the components of the IHS 100, and in specific examples below are described as being provided by server devices. However, while illustrated and discussed as being provided by server devices, one of skill in the art in possession of the present disclosure will recognize that host devices 202-206 provided in the ALUA path distribution system 200 may include any devices that may be configured to operate similarly as the host devices 202-206 discussed below.

As illustrated, each of the host devices 202-206 may include a plurality of ports. For example, the host device 202 may include an adapter (e.g., a Host Bus Adapter (HBA), a Converged Network Adapter (CNA), and/or other adapters that would be apparent to one of skill in the art in possession of the present disclosure) having a pair of ports 202a and 202b, the host device 204 may include an adapter (e.g., an HBA, a CNA, and/or other adapters that would be apparent to one of skill in the art in possession of the present disclosure) having a pair of ports 204a and 204b, and the host device 206 may include an adapter (e.g., an HBA, a CNA, and/or other adapters that would be apparent to one of skill in the art in possession of the present disclosure) having a pair of ports 206a and 206b. However, while particular host devices 202-206 are described and illustrated, one of skill in the art in possession of the present disclosure will appreciate that different numbers of host devices with different components and/or component configurations will fall within the scope of the present disclosure as well.

In an embodiment, the ALUA path distribution system 200 also includes a plurality of aggregated networking devices such as the aggregated networking devices 204a and 204b illustrated in FIG. 2. The aggregated networking devices 204a and 204b may be provided by the IHS 100 discussed above with reference to FIG. 1, and/or may include some or all of the components of the IHS 100, and in examples below are described as being provided by switch devices. However, while illustrated and discussed as being provided by switch devices, one of skill in the art in possession of the present disclosure will recognize that aggregated networking devices 204 and 204b provided in the ALUA path distribution system 200 may include any devices that may be configured to operate similarly as the aggregated networking devices 204 and 204b discussed below. As illustrated, the aggregated networking device 204a is coupled the port 202a on the host device 202, the port 204a on the host device 204, and the port 206a on the host device 206. Similarly, the aggregated networking device 204b is coupled the port 202b on the host device 202, the port 204b on the host device 204, and the port 206b on the host device 206.

Furthermore, the aggregated networking devices 204a and 204b are illustrated as each being coupled to a management server device 206 that, as discussed above, provides a Network Management System (NMS) with NMS tools that are configured to operate via the Simple Network Management Protocol (SNMP), the REpresentational State Transfer CONFiguration (RESTCONF) protocol, and/or other protocols known in the art that enable the get operations, set operations, and/or other operations that would be apparent to one of skill in the art in possession of the present disclosure. The management server device 206 may be provided by the IHS 100 discussed above with reference to FIG. 1, and/or may include some or all of the components of the IHS 100. However, while illustrated and discussed as being provided by a server device, one of skill in the art in possession of the present disclosure will recognize that management devices provided in the ALUA path distribution system 200 may include any devices that may be configured to operate similarly as the management server device 206 discussed below.

In an embodiment, the ALUA path distribution system 200 also includes a plurality of storage subsystems 208 such as the storage subsystems 208, 210, and 212 illustrated in FIG. 2. Any or all of the storage subsystems 208-210 may be provided by the IHS 100 discussed above with reference to FIG. 1, and/or may include some or all of the components of the IHS 100, and in specific examples below are described as being provided by storage devices (e.g., Hard Disk Drives (HDDs), Solid State Drives (SSDs), etc.). However, while illustrated and discussed as being provided by storage devices, one of skill in the art in possession of the present disclosure will recognize that storage subsystems 208-210 provided in the ALUA path distribution system 200 may include any devices that may be configured to operate similarly as the storage subsystems 208-210 discussed below. As illustrated, each of the storage subsystems 208-210 may include a plurality of ports, with each port coupled to a respective storage controller.

For example, the storage subsystem 208 may include a pair of ports 208a and 208b coupled to respective storage controllers 208c and 208d that are in turn coupled to each other via an interconnect 208e, the storage subsystem 210 may include a pair of ports 210a and 210b coupled to respective storage controllers 210c and 210d that are in turn coupled to each other via an interconnect 210e, and the storage subsystem 212 may include a pair of ports 212a and 212b coupled to respective storage controllers 212c and 212d that are in turn coupled to each other via an interconnect 212e. As discussed in further detail below, each of the storage subsystems 208-212 may include storage elements (not illustrated) that may be utilized to provide logical units that are configured to store data and that are identified by Logical Unit Numbers (LUNs). However, while particular storage subsystems 208-210 are described and illustrated, one of skill in the art in possession of the present disclosure will appreciate that different numbers of storage subsystems with different components and/or component configurations will fall within the scope of the present disclosure as well. Furthermore, while a specific ALUA path distribution system 200 has been illustrated and described, one of skill in the art in possession of the present disclosure will recognize that the ALUA path distribution system of the present disclosure may include a variety of components and component configurations while remaining within the scope of the present disclosure as well.

Figure 3:
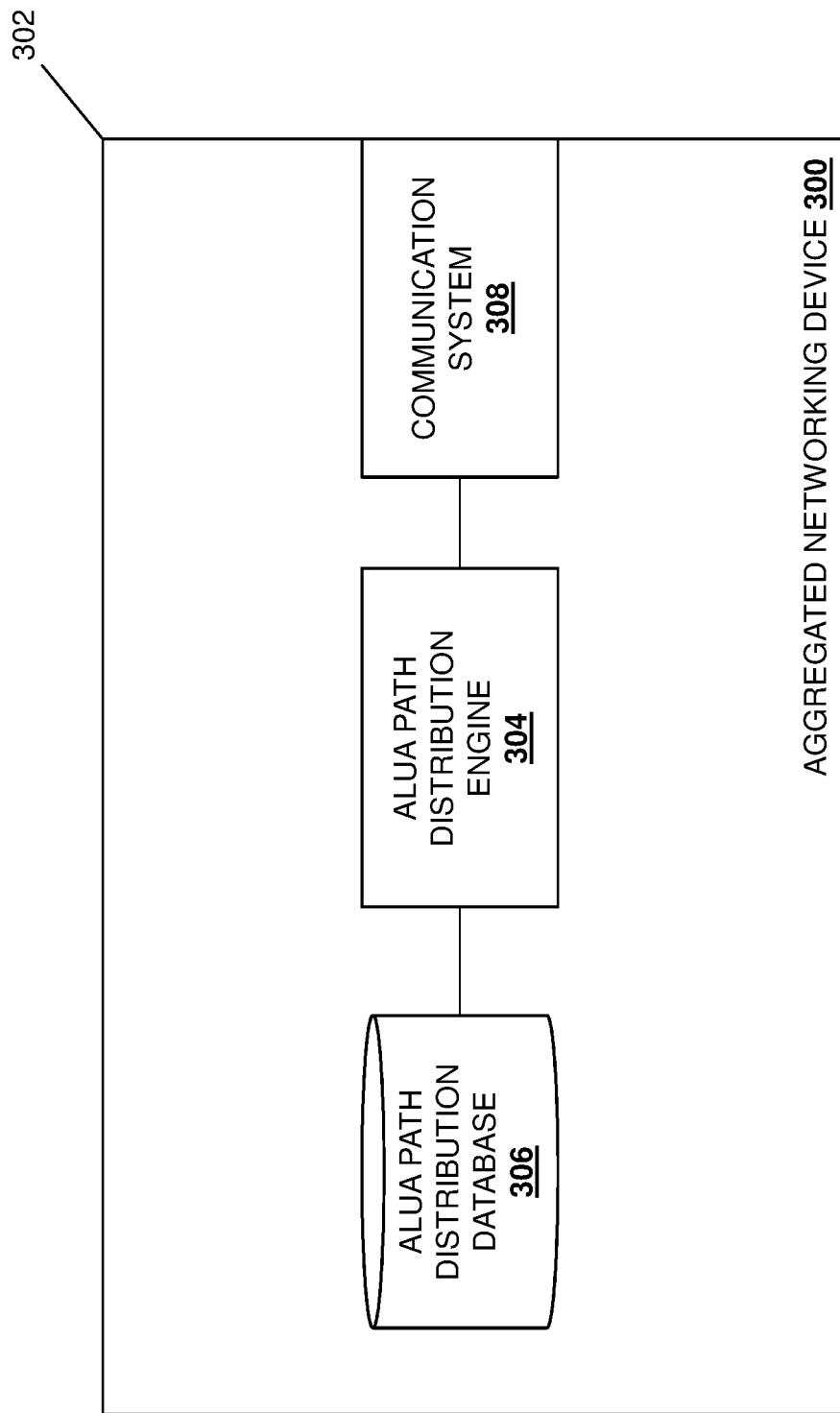
FIG. 3 is a schematic view illustrating an embodiment of an aggregated networking device that may be provided in the ALUA path distribution system of FIG. 2.

Referring now to FIG. 3, an embodiment of an aggregated networking device 300 is illustrated that may provide either or both of the aggregated networking devices 204a and 204b discussed above with reference to FIG. 2. As such, the aggregated networking device 300 may be provided by the IHS 100 discussed above with reference to FIG. 1 and/or may include some or all of the components of the IHS 100. However, while illustrated and discussed as a switch device, one of skill in the art in possession of the present disclosure will recognize that the functionality of the aggregated networking device 300 discussed below may be provided by other devices that are configured to operate similarly as aggregated networking device 300 discussed below. In the illustrated embodiment, the aggregated networking device 300 includes a chassis 302 that houses the components of the aggregated networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an ALUA path distribution engine 304 that is configured to perform the functionality of the ALUA path distribution engines and/or aggregated networking devices discussed below.

The chassis 302 may also house a storage system (not illustrated, but which may include the storage 108 discussed above with reference to FIG. 1) that is coupled to the ALUA path distribution engine 304 (e.g., via a coupling between the storage system and the processing system) and that includes an ALUA path distribution database 306 that is configured to store any of the information utilized by the ALUA path distribution engine 304 discussed below. The chassis 302 may also house a communication system 308 that is coupled to the ALUA path distribution engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific aggregated networking device 300 has been illustrated, one of skill in the art in possession of the present disclosure will recognize that aggregated networking devices (or other devices operating according to the teachings of the present disclosure in a manner similar to that described below for the aggregated networking device 300) may include a variety of components and/or component configurations for providing conventional aggregated networking device functionality, as well as the functionality discussed below, while remaining within the scope of the present disclosure as well.

Figure 4:
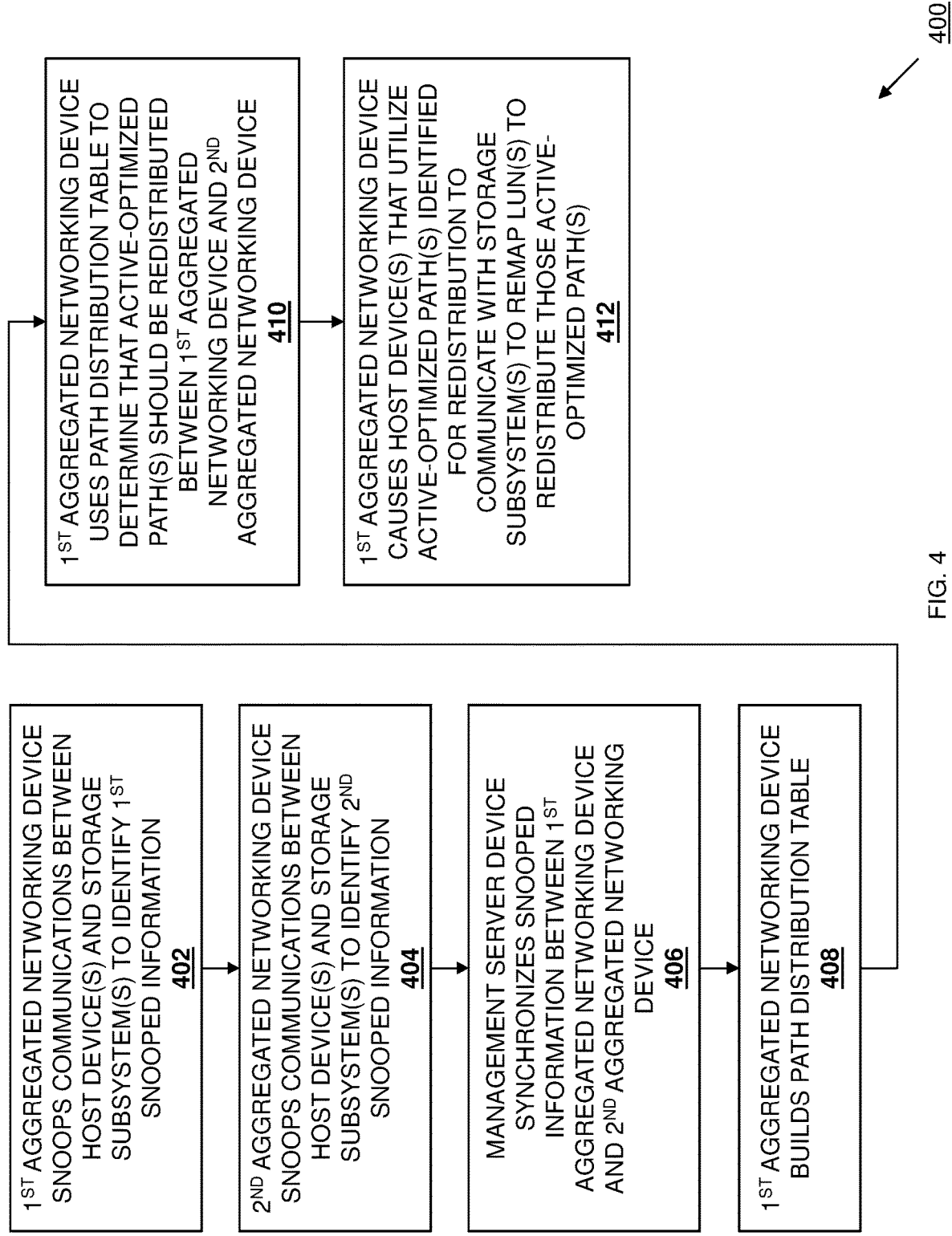
FIG. 4 is a flow chart illustrating an embodiment of a method for distributing paths in an ALUA system.

Referring now to FIG. 4, an embodiment of a method 400 for distributing paths in an ALUA system is illustrated. As discussed below, the systems and methods of the present disclosure utilize a "big picture" view of the active-optimized path distribution between end devices that is available to the networking devices in an ALUA system, along with a feedback mechanism between the networking devices and host devices, in order to efficiently distribute active-optimized paths between the networking devices. For example, networking devices in an ALUA system may snoop communications between the host devices and the storage subsystems in that ALUA system, and a management server may synchronize any snooped information between the networking devices. This allows the networking devices to use the snooped information to build a path distribution table that identifies each active-optimized path provided by the networking devices between host devices and Logical Unit Numbers (LUNs) included on the storage subsystems. Any networking device may then use the path distribution table to determine that an active-optimized path that it provides should be redistributed to being provided by another networking device and, in response, cause a host device that utilizes that active-optimized path to communicate with a storage subsystem to remap a LUN accessed via that active-optimized path such that that active-optimized path is redistributed to being provided by the other networking device. As such, aggregated networking devices may be utilized more efficiently than in conventional ALUA systems.

Figure 5:
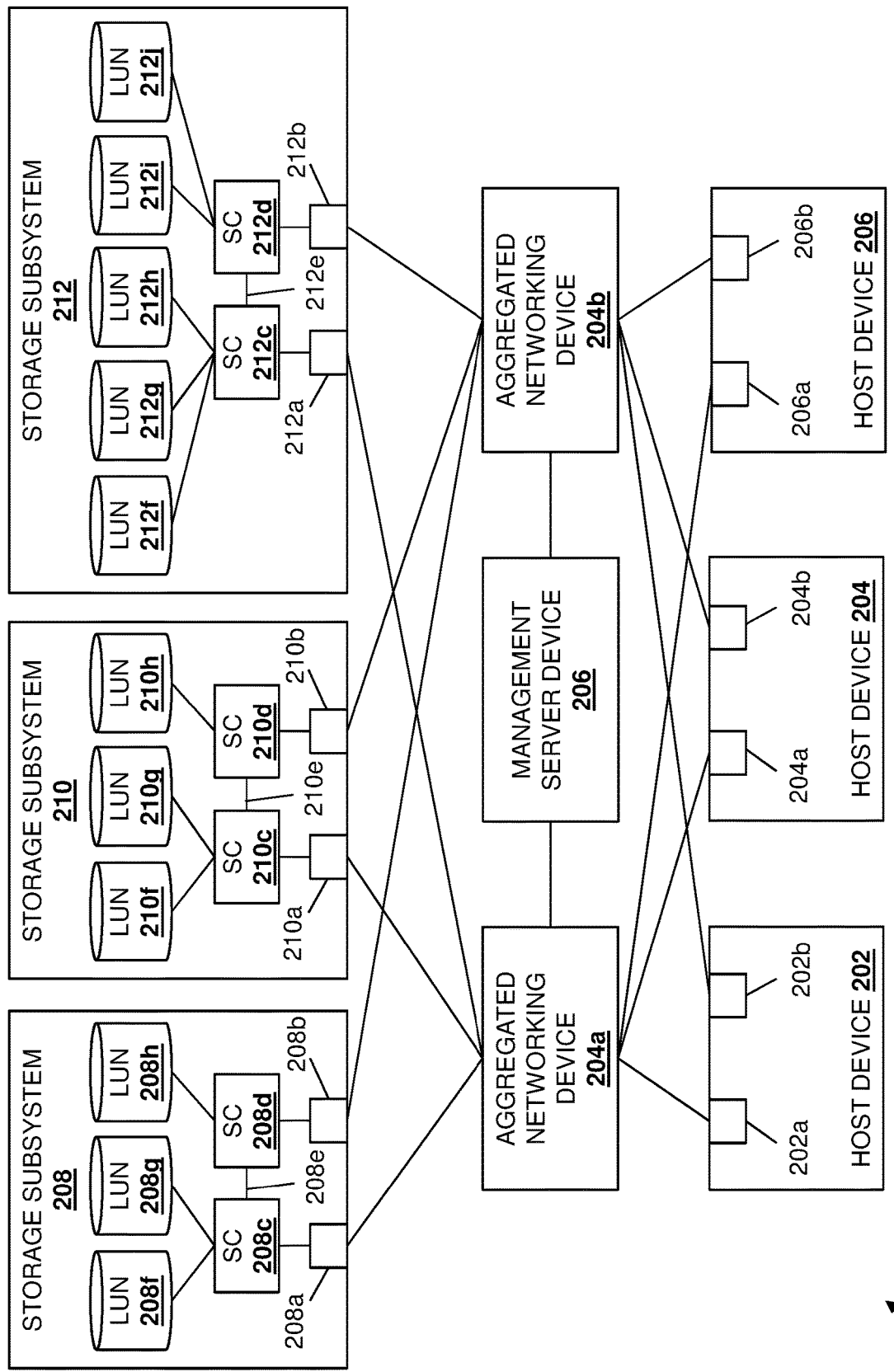
FIG. 5 is a schematic view illustrating an embodiment of the ALUA path distribution system of FIG. 2 operating during the method of FIG. 4.

In an embodiment, at or during the method 400, the storage subsystems 208, 210, and 212 may each be configured to provide logical unit(s) for the storage of data. For example, as illustrated in FIG. 5, the storage subsystem 208 has been configured to provide logical units identified by Logical Unit Numbers (LUNs) 208f, 208g, and 208h, with the LUNs 208f and 208g owned by the storage controller 208c, and the LUN 208h owned by the storage controller 208d. Similarly, the storage subsystem 210 has been configured to provide logical units identified by LUNs 210f, 210g, and 210h, with the LUNs 210f and 210g owned by the storage controller 210c, and the LUN 210h owned by the storage controller 210d. Similarly, the storage subsystem 212 has been configured to provide logical units identified by LUNs 212f, 212g, 212h, 212i, and 212j, with the LUNs 212f, 212g, and 212h owned by the storage controller 212c, and the LUNs 212i and 212j owned by the storage controller 212d. The configuration of LUNs on storage subsystems is known in the art and thus is not discussed herein in detail.

Furthermore, as will be appreciated by one of skill in the art in possession of the present disclosure, the LUNs provided via the storage subsystems 208, 210, and 212 in FIG. 5 may have been subject to host/target balancing operations that operate to attempt to balance the LUNs across the storage controllers within each storage subsystem (e.g., with two LUNs owned by the storage controller 208c and one LUN owned by the storage controller 208d in the storage subsystem 208, two LUNs owned by the storage controller 210c and one LUN owned by the storage controller 210d in the storage subsystem 210, and three LUNs owned by the storage controller 212c and two LUNs owned by the storage control 212d in the storage subsystem 212.) However, while FIG. 5 and the examples below illustrate LUNs balanced on an individual-storage-subsystem level, one of skill in the art in possession of the present disclosure will recognize that the LUN distribution illustrated in FIG. 5 may change such that those LUNs are not balanced across the storage controllers within each storage subsystem, and the method 400 may operate on such system configurations similarly as discussed below.

Figure 6A:
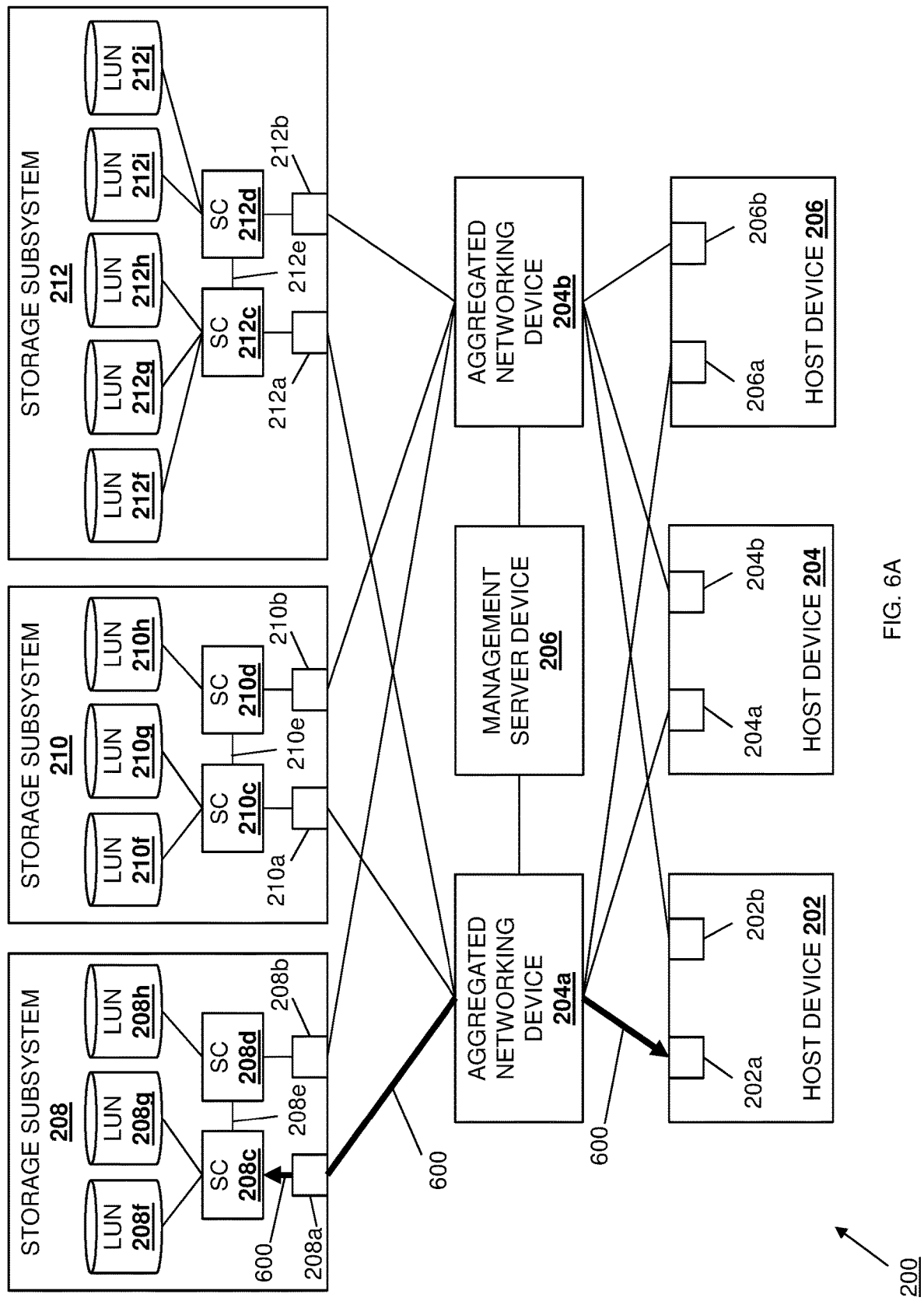
FIG. 6A is a schematic view illustrating an embodiment of the ALUA path distribution system of FIG. 2 operating during the method of FIG. 4.
Figure 6B:
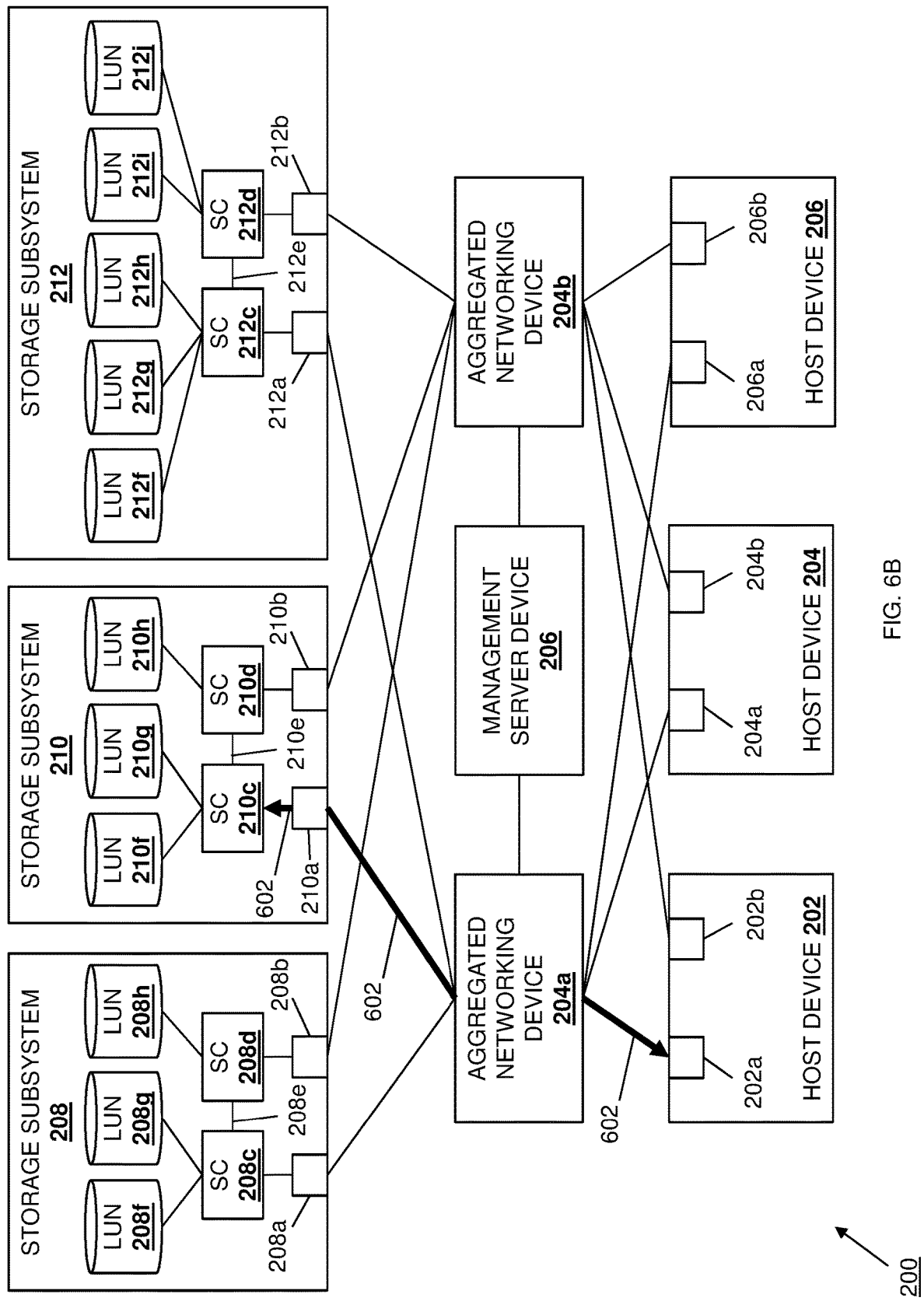
FIG. 6B is a schematic view illustrating an embodiment of the ALUA path distribution system of FIG. 2 operating during the method of FIG. 4.
Figure 6C:
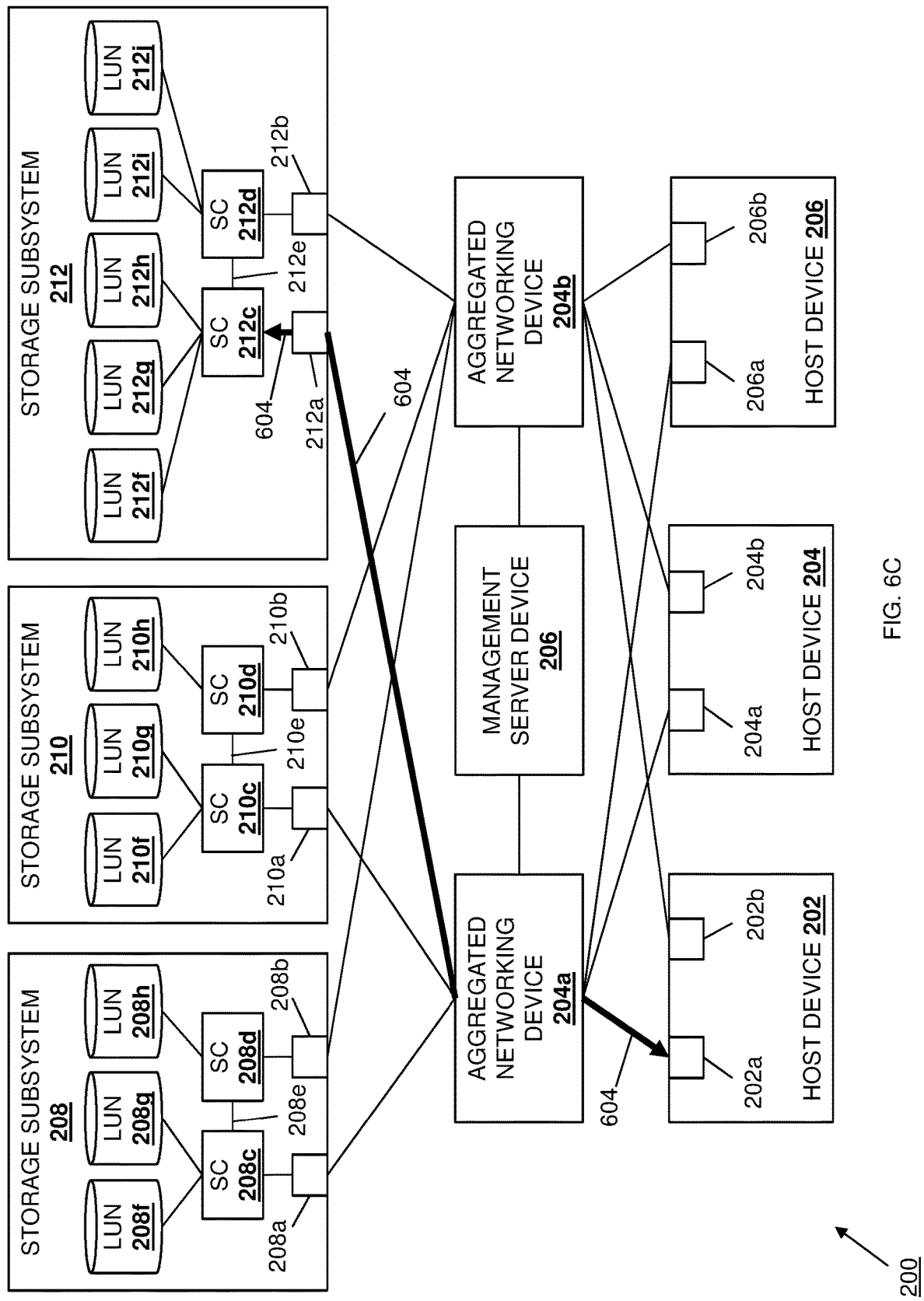
FIG. 6C is a schematic view illustrating an embodiment of the ALUA path distribution system of FIG. 2 operating during the method of FIG. 4.

The method 400 begins at block 402 where a first aggregated networking device snoops communications between host device(s) and storage subsystem(s) to identify first snooped information. In an embodiment, at block 402, the host devices 202, 204 and 206 may operate to transmit communications with the storage subsystems 208, 210, and 212. For example, FIG. 6A illustrates how the host device 202 may operate to transmit communications 600 with the storage controller 208c via its port 202a, the aggregated networking device 204a, and the port 208a on the storage subsystem 208; FIG. 6B illustrates how the host device 202 may operate to transmit communications 602 with the storage controller 210c via its port 202a, the aggregated networking device 204a, and the port 210a on the storage subsystem 210, and FIG. 6C illustrates how the host device 202 may operate to transmit communications 604 with the storage controller 212c via its port 202a, the aggregated networking device 204a, and the port 212a on the storage subsystem 212. Furthermore, while not explicitly illustrated, one of skill in the art in possession of the present disclosure will appreciate that the host devices 204 and 206 may transmit communications with the storage controllers 208c, 210c, and 212c via their ports 204a and 206a, respectively, the aggregated networking device 204a, and the respective ports 208a, 210a, and 212a on the storage subsystems 208, 210, and 212, respectively, in substantially the same manner while remaining within the scope of the present disclosure as well.

In an embodiment, the communications between the host device 202 and the storage subsystems 208, 210, and 212 via the aggregated networking device 204a may include LUN-specific Small Computer System Interface (SCSI) inquiry communications, Report Target Port Group (RTPG) communications, and/or other host device/storage subsystem communications that would be apparent to one of skill in the art in possession of the present disclosure. As such, at block 402, the ALUA path distribution engine 304 in the aggregated networking device 204a/300 may operate to snoop the communications it transmits between the host device 202 and the storage subsystems 208, 210, and 212 (e.g., the communications 600, 602, and 604 discussed above) in order to retrieve, determine, and/or otherwise identify snooped information in those communications. In a specific example, the communications transmitted by the host device 202 with the storage subsystems 208, 210, and 212 may include log-in communications with the storage subsystems 208, 210, and 212 that operate to retrieve the LUNs accessible to the host device 202, identify whether a path to each LUN is an active-optimized path or an active-non-optimized path, and/or any other information that would be apparent to one of skill in the art in possession of the present disclosure and that would provide for the functionality discussed below.

Thus, as discussed in some of the specific examples provided below, the snooped information retrieved by the aggregated networking device 204*a* from the snooped communications transmitted by the host device 202 at block 402 may include target information (e.g., that identifies the LUNs on the storage subsystems that are the subject of the communication), host information (e.g., that identifies the host device 202 transmitting the communication), aggregated-networking-device path state information (e.g., that identifies whether the aggregated networking device 204*a* provides an active-optimized path or an active-non-optimized path to the LUN that is the subject of the communication), and/or any other snooped communication information that would be apparent to one of skill in the art in possession of the present disclosure. The ALUA path distribution engine 304 in the aggregated networking device 204*a*/300 may then store that snooped information in its ALUA path distribution database 306.

Figure 7A:
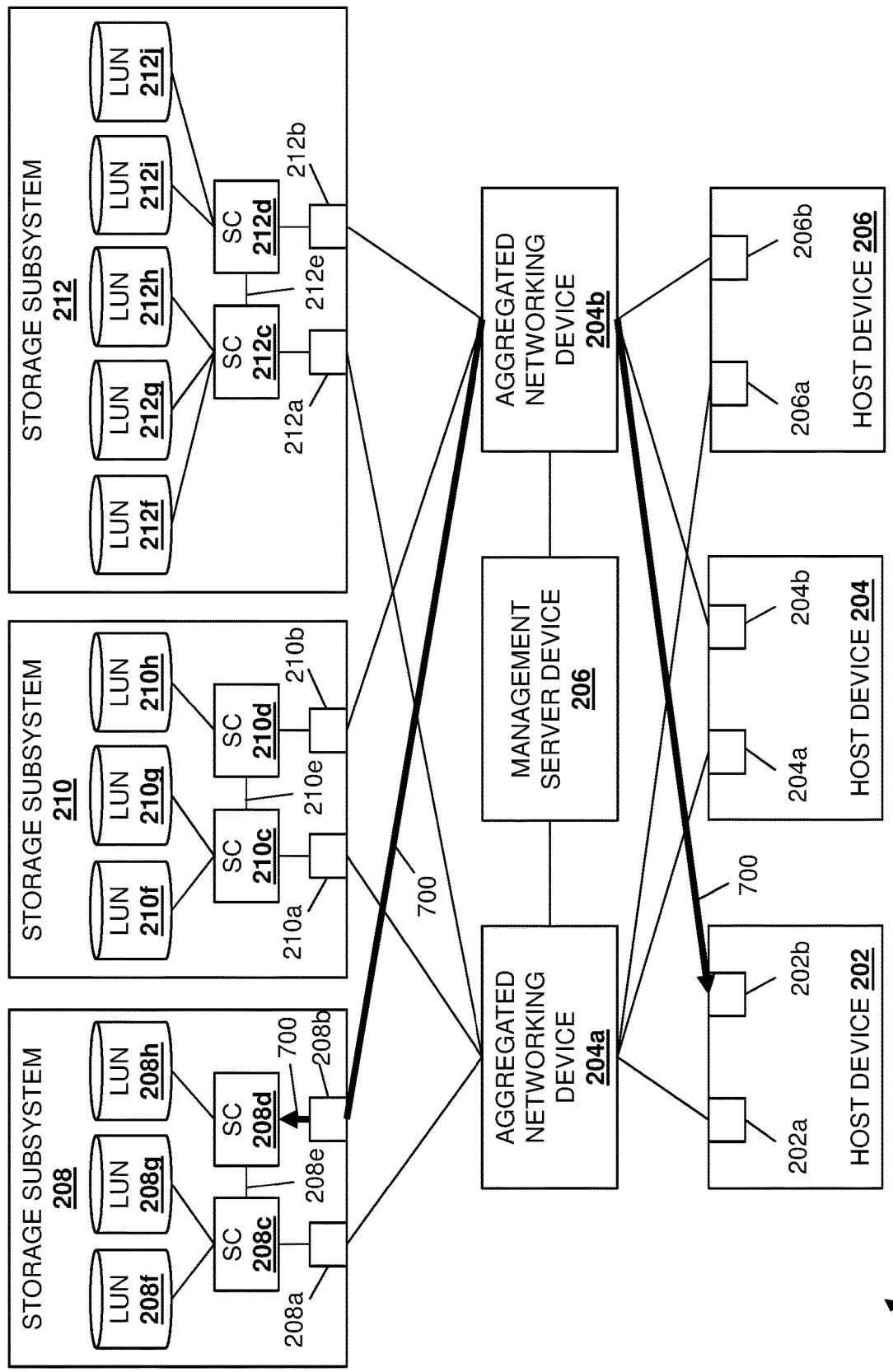
FIG. 7A is a schematic view illustrating an embodiment of the ALUA path distribution system of FIG. 2 operating during the method of FIG. 4.
Figure 7B:
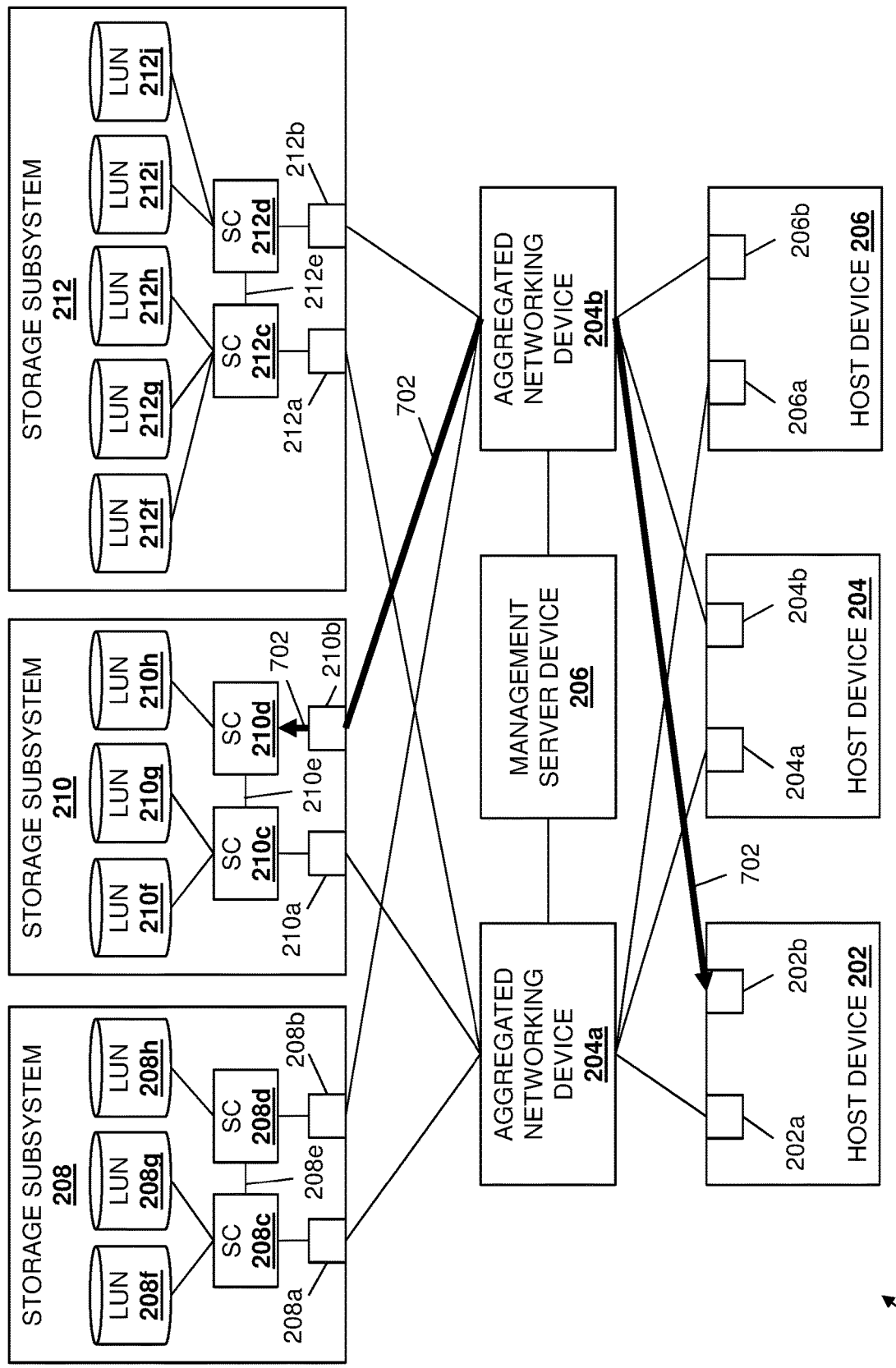
FIG. 7B is a schematic view illustrating an embodiment of the ALUA path distribution system of FIG. 2 operating during the method of FIG. 4.
Figure 7C:
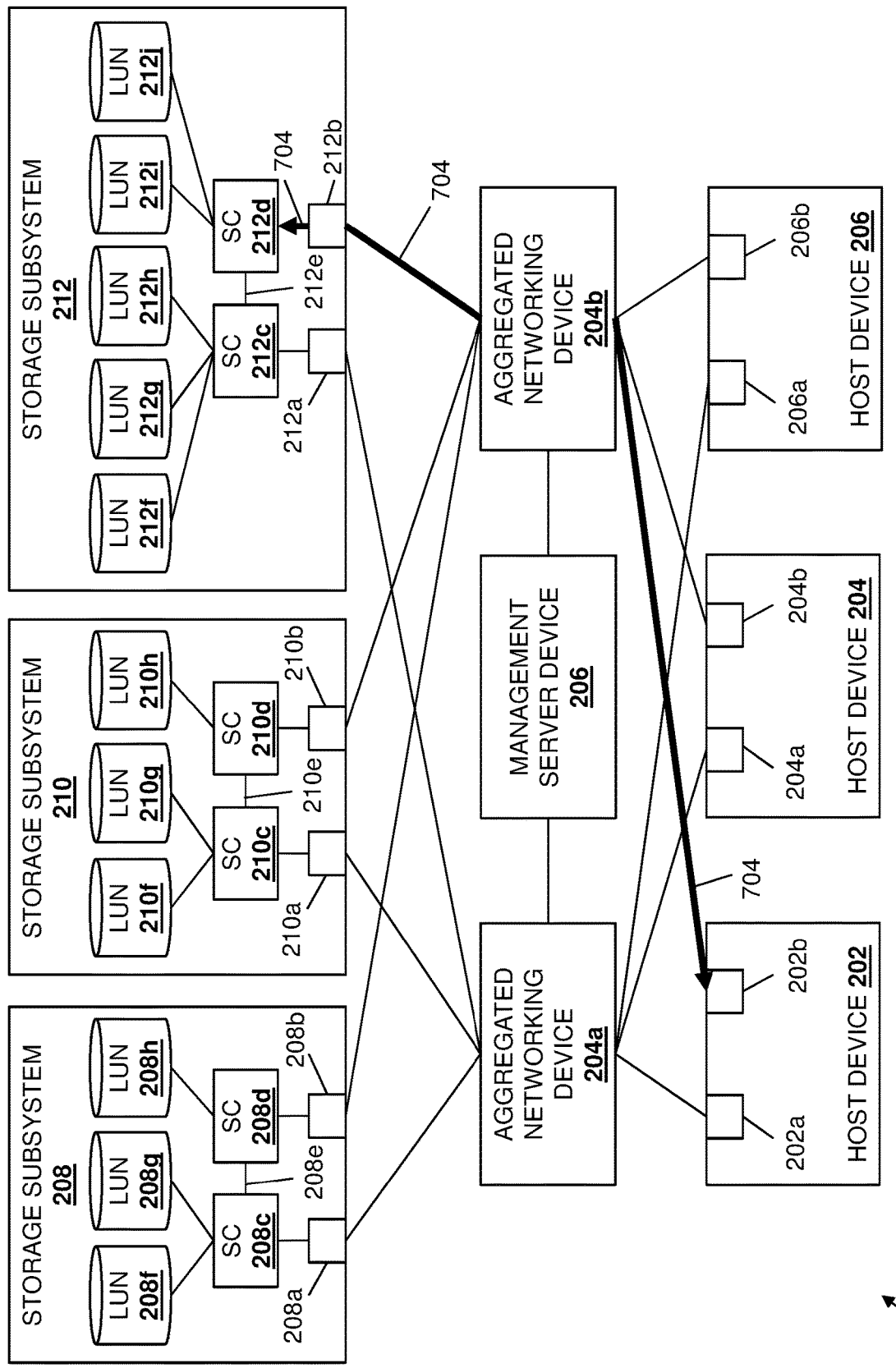
FIG. 7C is a schematic view illustrating an embodiment of the ALUA path distribution system of FIG. 2 operating during the method of FIG. 4.

The method 400 then proceeds to block 404 where a second aggregated networking device snoops communications between host device(s) and storage subsystem(s) to identify second snooped information. Similarly as discussed above, at block 404, the host devices 202, 204 and 206 may operate to transmit communications with the storage subsystems 208, 210, and 212. For example, FIG. 7A illustrates how the host device 202 may operate to transmit communications 700 with the storage controller 208*c* via its port 202*b*, the aggregated networking device 204*b*, and the port 208*b* on the storage subsystem 208; FIG. 7B illustrates how the host device 202 may operate to transmit communications 702 with the storage controller 210*d* via its port 202*b*, the aggregated networking device 204*b*, and the port 210*b* on the storage subsystem 210, and FIG. 7C illustrates how the host device 202 may operate to transmit communications 704 with the storage controller 212*d* via its port 202*b*, the aggregated networking device 204*b*, and the port 212*b* on the storage subsystem 212. Furthermore, while not explicitly illustrated, one of skill in the art in possession of the present disclosure will appreciate that the host devices 204 and 206 may transmit communications with the storage controllers 208*d*, 210*d*, and 212*d* via their ports 204*b* and 206*b*, respectively, the aggregated networking device 204*b*, and the respective ports 208*b*, 210*b*, and 212*b* on the storage subsystems 208, 210, and 212, respectively, in substantially the same manner while remaining within the scope of the present disclosure as well.

Similarly as discussed above, the communications between the host device 202 and the storage subsystems 208, 210, and 212 via the aggregated networking device 204*b* may include LUN-specific SCSI inquiry communications, RTPG communications, and/or other host device/storage subsystem communications that would be apparent to one of skill in the art in possession of the present disclosure. As such, at block 404, the ALUA path distribution engine 304 in the aggregated networking device 204*b*/300 may operate to snoop the communications it transmits between the host device 202 and the storage subsystems 208, 210, and 212 (e.g., the communications 700, 702, and 704 discussed above) in order to retrieve, determine, and/or otherwise identify snooped information in those communications. In a specific example, the communications transmitted by the host device 202 with the storage subsystems 208, 210, and 212 may include log-in communications with the storage subsystems 208, 210, and 212 that operate to retrieve the LUNs accessible to the host device 202, identify whether a path to each LUN is an active-optimized path or an active-non-optimized path, and/or any other information that would be apparent to one of skill in the art in possession of the present disclosure and that would provide for the functionality discussed below.

Thus, as discussed in some of the specific examples provided below, the snooped information retrieved by the aggregated networking device 204*b* from the snooped communications transmitted by the host device 202 at block 404 may include target information (e.g., that identifies the LUNs on the storage subsystems that are the subject of the communication), host information (e.g., that identifies the host device 202 transmitting the communication), aggregated-networking-device path state information (e.g., that identifies whether the aggregated networking device 204*b* provides an active-optimized path or an active-non-optimized path to the LUN that is the subject of the communication), and/or any other snooped communication information that would be apparent to one of skill in the art in possession of the present disclosure. The ALUA path distribution engine 304 in the aggregated networking device 204*b*/300 may then store that snooped information in its ALUA path distribution database 306.

The method 400 then proceeds to block 406 where a management server devices synchronizes snooped information between the first aggregated networking device and the second aggregated networking device. As discussed in some of the specific examples above, at blocks 402 and 404, the ALUA path distribution engines 304 in the aggregated networking devices 204*a*/300 and 204*b*/300 may snoop any communications they transmit between the host devices 202, 204, and 206 and the storage subsystems 208, 210, and 212, and retrieve snooped information from those communications that identifies LUNs on the storage subsystems 208, 210, and 212; host devices 202, 204, and 206 logged into those storage subsystems 208, 210, and 212; and whether the aggregated networking devices 204*a* and 204*b* provide an active-optimized path or an active-non-optimized path to each LUN. As such, as will be appreciated by one of skill in the art in possession of the present disclosure, each ALUA path distribution engine 304 in each of the aggregated networking devices 204*a*/300 and 204*b*/300 may have stored snooped information in its ALUA path distribution database 306 that provides a partial "picture" of the paths provided between the host devices 202, 204, and 206 and the LUNs in the storage subsystems 208, 210, and 212 via that aggregated networking device.

Figure 8A:
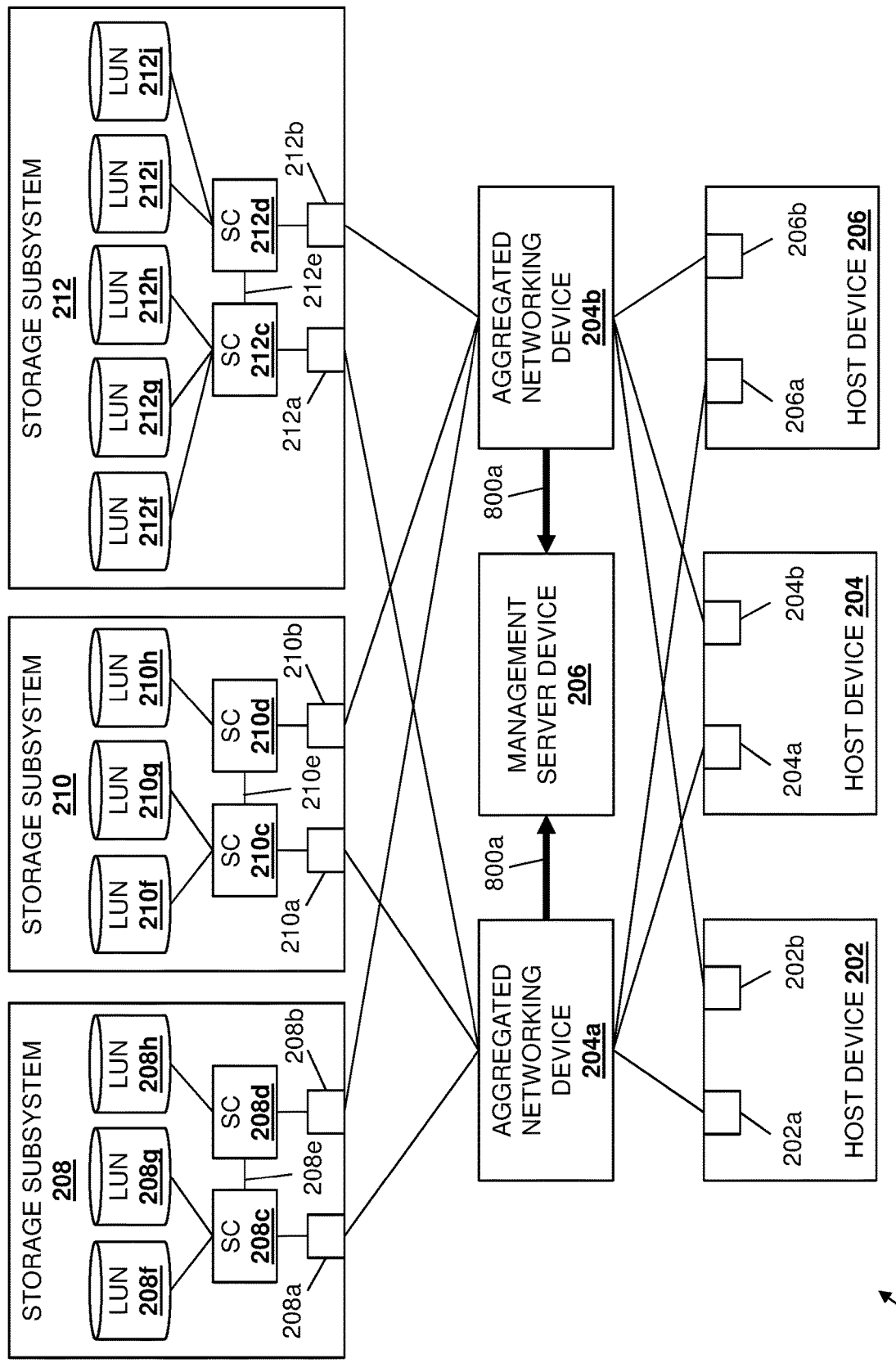
FIG. 8A is a schematic view illustrating an embodiment of the ALUA path distribution system of FIG. 2 operating during the method of FIG. 4.
Figure 8B:
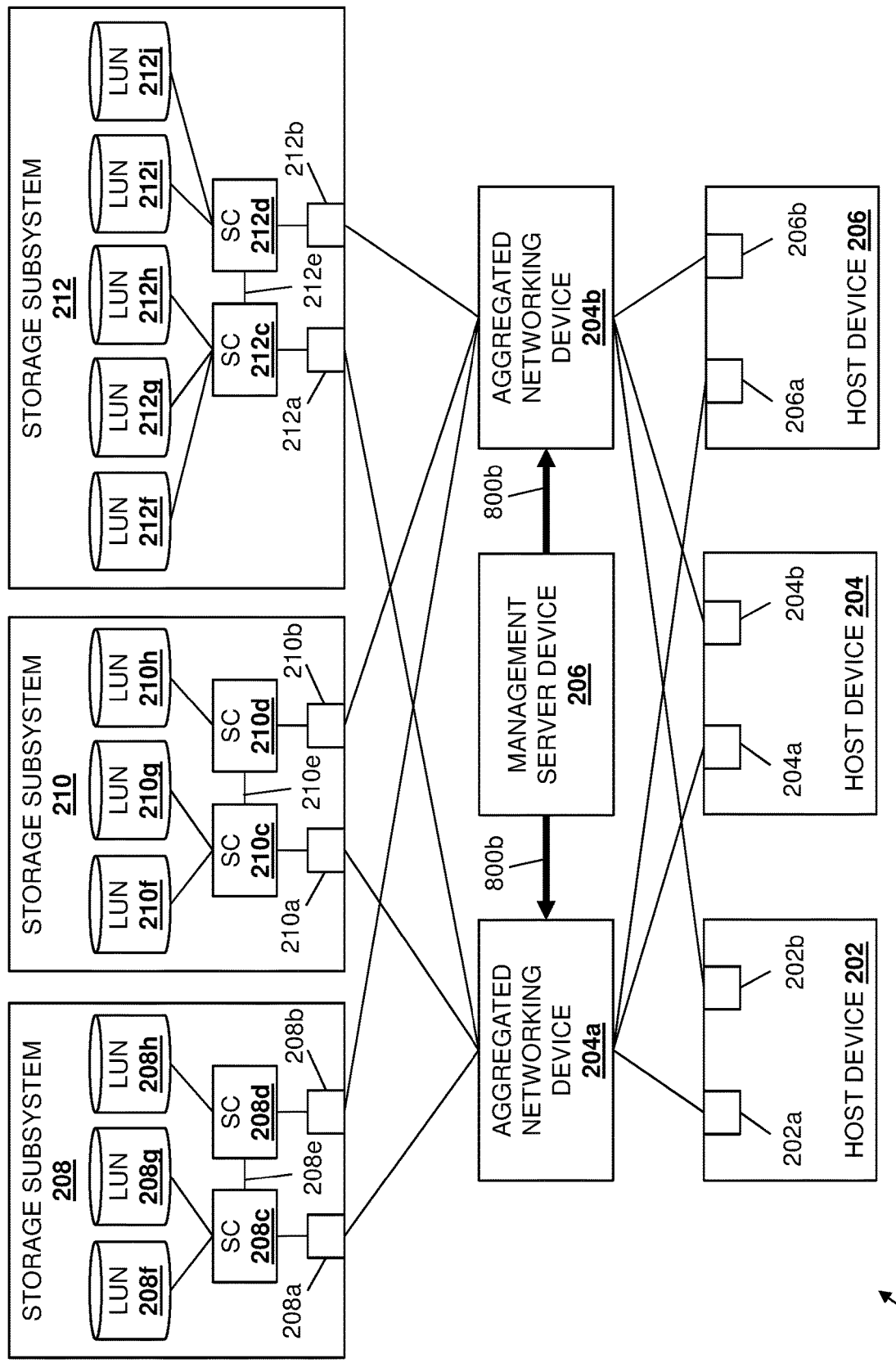
FIG. 8B is a schematic view illustrating an embodiment of the ALUA path distribution system of FIG. 2 operating during the method of FIG. 4.

As such, as illustrated in FIGS. 8A and 8B, in an embodiment of block 406 the management server device 206 may operate to perform synchronization operations 800 in order to synchronize the snooped information in the ALUA path distribution databases 306 in each of the aggregated networking devices 204*a*/300 and 204*b*/300. For example, FIG. 8A illustrates the management server device 206 performing "get" operations 800*a* (e.g., according to the SNMP or RESTCONF protocol discussed above) to retrieve the snooped information in the ALUA path distribution databases 306 in each of the aggregated networking devices 204*a*/300 and 204*b*/300, while FIG. 8B illustrates the management server device 206 performing "set" operations 800*b* (e.g., according to the SNMP or RESTCONF protocol discussed above) to provide snooped information in the ALUA path distribution databases 306 in each of the aggregated networking devices 204*a*/300 and 204*b*/300, in order to synchronize those ALUA path distribution databases 306 in each of the aggregated networking devices 204*a*/300 and 204*b*/300.

Thus, one of skill in the art in possession of the present disclosure will appreciate that the "get" operations 800*a* and "set" operations 800b may operate to provide any snooped information retrieved by the ALUA path distribution engine 304 in the aggregated networking device 204a/300 at block 402 in the ALUA path distribution database 306 included in the aggregated networking device 204b/300, and provide any snooped information retrieved by the ALUA path distribution engine 304 in the aggregated networking device 204b/300 at block 404 in the ALUA path distribution database 306 included in the aggregated networking device 204b/300, thus providing each ALUA path distribution database 306 in the aggregated networking devices 204a/300 and 204b/300 with snooped information that provides a full "picture" of the paths provided between the host devices 202, 204, and 206 and the LUNs in the storage subsystems 208, 210, and 212 via the aggregated networking devices 204a and 204b.

The method 400 then proceeds to block 408 where the first aggregated networking device builds a path distribution table. In an embodiment, at block 408, the ALUA path distribution engine 304 in the aggregated networking device 204a/300 may operate to utilize the snooped information in its ALUA path distribution database 306 to build a path distribution table. While not described in detail below, one of skill in the art in possession of the present disclosure will appreciate that the ALUA path distribution engine 304 in the aggregated networking device 204b/300 may operate to utilize the snooped information in its ALUA path distribution database 306 to build the same path distribution table as the aggregated networking device 204a, as the synchronization operations 800 performed at block 406 may have provided the same snooped information in each ALUA path distribution database 306 in the aggregated networking devices 204a/300 and 204b/300. With reference to FIG. 9, an ALUA path distribution database 900 is illustrated that may be the ALUA path distribution database 306 discussed above with reference to FIG. 3, and that ALUA path distribution database 900 includes a path distribution table 902 that may be built by either or both of the ALUA path distribution engines 304 in the aggregated networking devices 204a/300 and 204b/300 at block 408. In the illustrated embodiment, the path distribution table 902 includes a LUN column 904, a host device column 906, an aggregated networking device 204a state column 908, and an aggregated networking device 204b state column 910. However, while a specific path distribution table 902 is illustrated, one of skill in the art in possession of the present disclosure will recognize that other path distribution table configurations, and/or other techniques for providing access to the information in the path distribution table 902, will fall within the scope of the present disclosure as well.

As such, at block 408, the ALUA path distribution engine 304 in the aggregated networking device 204a may generate a plurality of path distribution entries 912a, 912b, and up to 912n, and provide those path distribution entries 912a-912n in the path distribution table 902, as illustrated in FIG. 9. As can be seen in FIG. 9, the path distribution entry 912a identifies the LUN 208f on the storage subsystem 208 in the LUN column 904, the host device 202 in the host device column 206, an active-optimized state for the aggregated networking device 204a that indicates that the aggregated networking device 204a provides an active-optimized path between the host device 202 and the LUN 208f, and an active-non-optimized state for the aggregated networking device 204b that indicates that the aggregated networking device 204b provides an active-non-optimized path between the host device 202 and the LUN 208f. Similarly, the path distribution entry 912b identifies the LUN 208g on the storage subsystem 208 in the LUN column 904, the host device 202 in the host device column 206, an active-optimized state for the aggregated networking device 204a that indicates that the aggregated networking device 204a provides an active-optimized path between the host device 202 and the LUN 208g, and an active-non-optimized state for the aggregated networking device 204b that indicates that the aggregated networking device 204b provides an active-non-optimized path between the host device 202 and the LUN 208g. One of skill in the art in possession of the present disclosure will appreciate that the remaining path distribution entries in the path distribution table 902 identify similar information about the paths between the LUNs in the storage subsystems 208, 210, and 212, and the host devices 202, 204, and 206.

As will be appreciated by one of skill in the art in possession of the present disclosure, each active-optimized path and active-non-optimized path between a particular host device and a LUN provided on a storage subsystem may be provided according to ALUA techniques known in the art. In an embodiment, continuing with the specific example provided above, the path from the host device 202 (via its port 202a), the aggregated networking device 204a, and to the LUN 208f (via the port 208a and the storage controller 208c) may be designated as an "active-optimized" path due to data transmitted via that path being handled by a single storage controller (i.e., the storage controller 208c) to provide that data to the LUN 208f after being received at the port 208a on the storage subsystem 208.

To contrast, the path from the host device 202 (via its port 202b), the aggregated networking device 204b, and to the LUN 208f (via the port 208b, the storage controller 208d, the interconnect 208e, and the storage controller 208c) may be designated as an "active-non-optimized" path due to data transmitted via that path being handled by multiple storage controllers (i.e., the storage controllers 208c and 208e) to provide that data to the LUN 208f after being received at the port 208b on the storage subsystem 208. As will be appreciated by one of skill in the art in possession of the present disclosure, the use of the interconnect 208e to transmit data is undesirable due to, for example, increased data transmission latency, and thus the use of the interconnect 208e should be avoided when possible (e.g., unless the port 208a is unavailable.) This is accomplished by designating the active-optimized path and active-non-optimized path discussed above, and using the active-optimized path unless it is not available (in which case the active-non-optimized path may be used.) However, while particular primary/secondary paths are discussed, one of skill in the art in possession of the present disclosure will recognize that the teachings of the present disclosure may apply to other primary/secondary path distributions while remaining within the scope of the present disclosure as well.

As such, following block 408, each of the aggregated networking devices 204a/300 and 204b/300 may store copies of the path distribution table 902 in their ALUA path distribution databases 306/300, and that path distribution table 902 may identify each active-optimized path and active-non-optimized path between each host device 202, 204, and 206 and each LUN provided by a storage subsystem 208, 210, and 212, as well as which aggregated networking device 204a and 204b provides those active-optimized active non-optimized paths. However, while particular information is illustrated as being provided in the path distribution table 902 in FIG. 9, one of skill in the art in possession of the present disclosure will appreciate that other information about primary/secondary paths between end devices (e.g., host devices and target devices) may be provided while remaining within the scope of the present disclosure as well.

The method 400 then proceeds to block 410 where the first aggregated networking device uses the path distribution table to determine that active-optimized path(s) should be redistributed between the first aggregated networking device and the second aggregated networking device. In an embodiment, at block 410, the ALUA path distribution engine 304 in the aggregated networking device 204a may operate to identify that at least one active-optimized path provided by the aggregated networking device 204a should be redistributed to the aggregated networking device 204b. In the example below, the aggregated networking device 204a is described as determining that it provides an active-optimized path that should be redistributed to the aggregated networking device 204b, and one of skill in the art in possession of the present disclosure will appreciate that the aggregated networking device 204b may determine that it provides an active-optimized path that should be redistributed to the aggregated networking device 204a in substantially the same manner while remaining within the scope of the present disclosure as well.

With reference to the specific example provided by the path distribution table 902 in FIG. 9, at block 410 the ALUA path distribution engine 304 in the aggregated networking device 204a may operate to analyze the path distribution table 902 and determine that the aggregated networking device 204a provides seven active-optimized paths (e.g., between the host device 202 and the LUN 208f, between the host device 202 and the LUN 208g, between the host device 202 and the LUN 210f, between the host device 204 and the LUN 210g, between the host device 202 and the LUN 212f, between the host device 202 and the LUN 212g, and between the host device 204 and the LUN 212h), while the aggregated networking device 204b provides four active-optimized paths (e.g., between the host device 204 and the LUN 208h, between the host device 206 and the LUN 210h, between the host device 204 and the LUN 212i, and between the host device 206 and the LUN 212j.) As will be appreciated by one of skill in the art in possession of the present disclosure, such a distribution of active-optimized paths may result in the aggregated networking device 204a carrying more data traffic between the host devices 202, 204, and 206 and the storage subsystems 208, 210, and 212 than the aggregated networking device 204b (e.g., the aggregated networking device 204a may be "oversubscribed" relative to the aggregated networking device 204b), resulting in possible bandwidth issues with the aggregated networking device 204a and/or providing for an inefficient use of bandwidth available via the aggregated networking device 204b.

As such, in one embodiment, the ALUA path distribution engine 304 in the aggregated networking device 204a/300 may determine that the redistribution of one of the active-optimized paths provided by the aggregated networking device 204a to being provided by the aggregated networking device 204b may result in a more even distribution of active-optimized paths between the aggregated networking devices 204a and 204b (i.e., six active-optimized paths being provided by the aggregated networking device 204a and five active-optimized paths between provided by the aggregated networking device 204b following the redistribution). However, while a specific example of redistributing a single active-optimized path between aggregated networking devices is provided below, one of skill in the art in possession of the present disclosure will recognize that any number of active-optimized paths may be redistributed between aggregated networking devices while remaining within the scope of the present disclosure as well.

The method 400 then proceeds to block 412 where the first aggregated networking device causes host device(s) that utilize the active-optimized path(s) identified for redistribution to communicate with storage subsystem(s) to remap LUN(s) in order to redistribute those active-optimized path(s). In an embodiment, at block 412, the ALUA path distribution engine 304 in the aggregated networking device 204a/300 may identify a LUN that is provided on one of the storage subsystems 208, 210, and 212 and for which the aggregated networking device 204a provides an active-optimized path, and may select that LUN for rebalancing within its storage subsystem in order to provide for the redistribution of that active-optimized path between the aggregated networking devices 204a and 204b. In a specific example and with reference to the path distribution table 902, the ALUA path distribution engine 304 in the aggregated networking device 204a/300 may identify the LUN 212h for which it provides the active-optimized path for rebalancing in order to provide for the redistribution of that active-optimized path between the aggregated networking devices 204a and 204b and, at block 412, may send a LUN-rebalancing instruction to the host device 204 that utilizes that active optimized path to that LUN 212h to instruct the host device 204 to perform rebalancing operations with the storage subsystem 212 that includes that LUN 212h. In some examples, the ALUA path distribution engine 304 in the aggregated networking device 204a/300 may display (e.g., on a display device) active-optimized paths for redistribution and/or LUNs for rebalancing to an administrator, and the administrator may then select one or more active-optimized paths for redistribution and/or LUNs for rebalancing using, for example, command(s) issued via a Command-Line-Interface (CLI) available via the aggregated networking device 204a. In another example, the ALUA path distribution engine 304 in the aggregated networking device 204a/300 may automatically select (e.g., with the instruction from the administrator discussed above) one or more active-optimized paths for redistribution and/or LUNs for rebalancing As such, at block 412, the host device 204 may receive the LUN-rebalancing instruction and, in response, may perform LUN-rebalancing operations with the storage subsystem 212 in order to rebalance the LUN 212h between its storage controllers 212c and 212d. For example, the LUN-rebalancing instruction sent by the aggregated networking device 204a to the host device 204 may identify the LUN 212h for rebalancing, and the host device 204 may operate to generate and transmit Set Target Port Group (STPG) command(s) to the storage subsystem 212 in order to cause the ownership of the LUN 212h to be modified from the storage controller 212c to the storage controller 212d. As will be appreciated by one of skill in the art in possession of the present disclosure, the modification of the ownership of the LUN 212h from the storage controller 212c to the storage controller 212d may include modification of the access for the host device 204 to the LUN 212h on an active-optimized path via its port 202b, the aggregated networking device 204b, the port 212b on the storage subsystem 212, and the storage controller 212d (along with an active-non-optimized path via its port 202a, the aggregated networking device 204a, the port 212a on the storage subsystem 212, the storage controller 212c, the interconnect 212e, and the storage controller 212d.) As such, as illustrated in FIG. 10, the LUN 212h is illustrated as now being owned by the storage controller 212d (i.e., rather than being owned by the storage controller 212c, as was illustrated prior to the LUN-rebalancing operations)

As will be appreciated by one of skill in the art in possession of the present disclosure, the host devices 202, 204, and 206 may require an updated software stack (e.g., relative to conventional software stacks) in order to communicate with the aggregated networking devices 204a and 204b to provide for the active-optimized path redistributions discussed above. For example, for host devices utilizing Fibre Channel (FC) communications, the aggregated networking devices 204a and 204b (e.g., FC switch devices in this example) may utilize FC Extended Link Service (ELS) communications to communicate with the host devices 202, 204, and 206, with any reserved well-known address (e.g., FF:FF:(00-FF)) provided as the source address, the address of the host device provided as the destination address, and the LUN identifier (that identifies the LUN for rebalancing on the storage subsystem) provided in the payload. In another example, for host devices utilizing Fibre Channel over Ethernet (FCoE) communications, the aggregated networking devices 204a and 204b (e.g., FCoE switch devices in this example) may utilize the FC ELS communications substantially as discussed above, but with the FC ELS communications encapsulated with a Fibre Channel Forwarder (FCF) Media Access Control (MAC) address as the source address and a session MAC address of the enode as the destination address.

In yet another example, for host devices utilizing internet SCSI (iSCSI) communications, the aggregated networking devices 204a and 204b (e.g., FCoE switch devices in this example) may utilize Link Layer Discovery Protocol (LLDP) communications with Type-Length-Value (TLV) entries that include the LUN identifiers (that identify the LUN for rebalancing on the storage subsystem) to communicate with the host devices 202, 204, and 206, with the aggregated networking devices 204a and 204b snooping the LUN ownership details to select host devices for performing the active-optimized path redistribution discussed above. However, while several specific examples of the implementation of the ALUA path distribution system via host devices that utilize different communication technologies are described, one of skill in the art in possession of the present disclosure will appreciate that the ALUA path distribution system may be implemented in a variety of manners that will fall within the scope of the present disclosure as well.

Figure 10:
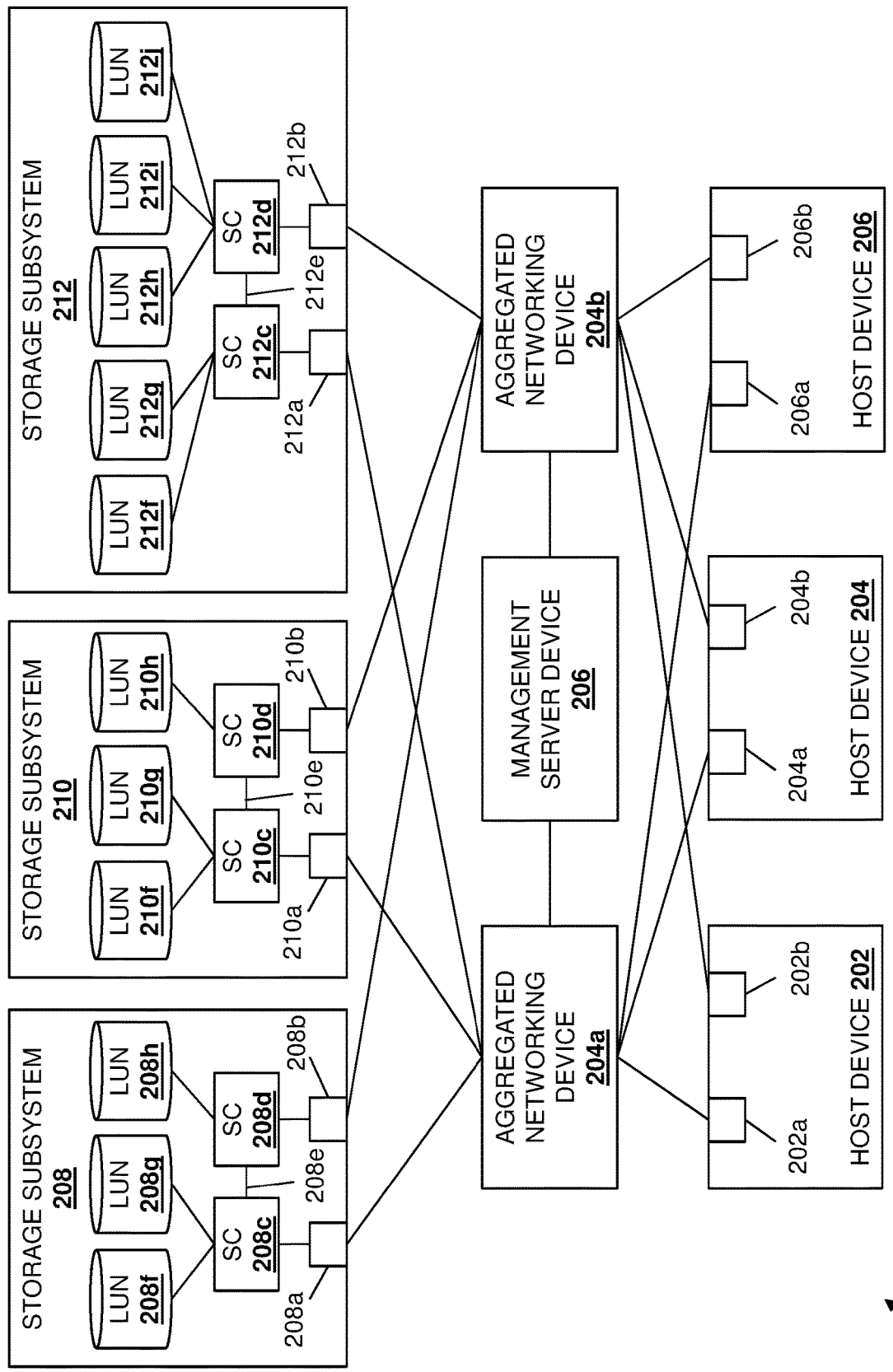
FIG. 10 is a schematic view illustrating an embodiment of the ALUA path distribution system of FIG. 2 operating during the method of FIG. 4.

As such, as illustrated in FIG. 10, the LUN 212h is illustrated as now being owned by the storage controller 212d (i.e., rather than being owned by the storage controller 212c prior to the LUN-rebalancing operations) and, as discussed above, the active-optimized path between the host device 204 and the LUN 212h may now be provided by the aggregated networking device 204b rather than the networking device 204a. Furthermore, continuing with the example provided above with regard to the path distribution table 902, the redistribution of the active-optimized paths will result in the aggregated networking device 204a providing six active-optimized paths (e.g., between the host device 202 and the LUN 208f, between the host device 202 and the LUN 208g, between the host device 202 and the LUN 210f, between the host device 204 and the LUN 210g, between the host device 202 and the LUN 212f, and between the host device 202 and the LUN 212g), and the aggregated networking device 204b providing five active-optimized paths (e.g., between the host device 204 and the LUN 208h, between the host device 206 and the LUN 210h, between the host device 204 and the LUN 212h, between the host device 204 and the LUN 212i, and between the host device 206 and the LUN 212j.) As will be appreciated by one of skill in the art in possession of the present disclosure, the active-optimized path redistribution provides a more even active-optimized path distribution between the aggregated networking devices 204a and 204b, reducing possible bandwidth issues with the aggregated networking device 204a and/or providing for a more efficient use of bandwidth available via the aggregated networking device 204b.

Figure 11:
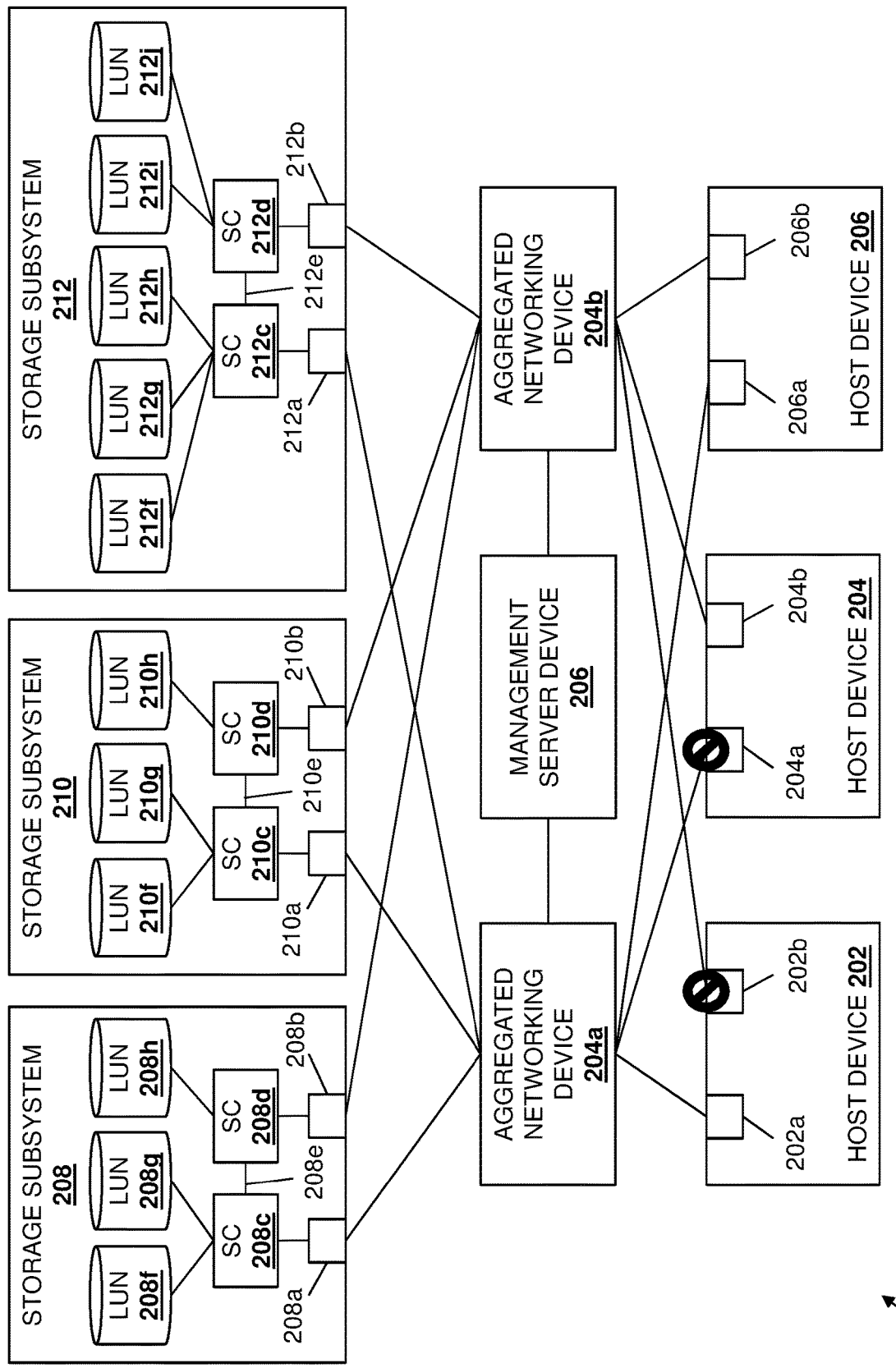
FIG. 11 is a schematic view illustrating an embodiment of the ALUA path distribution system of FIG. 2 operating during the method of FIG. 4.
Figure 12:
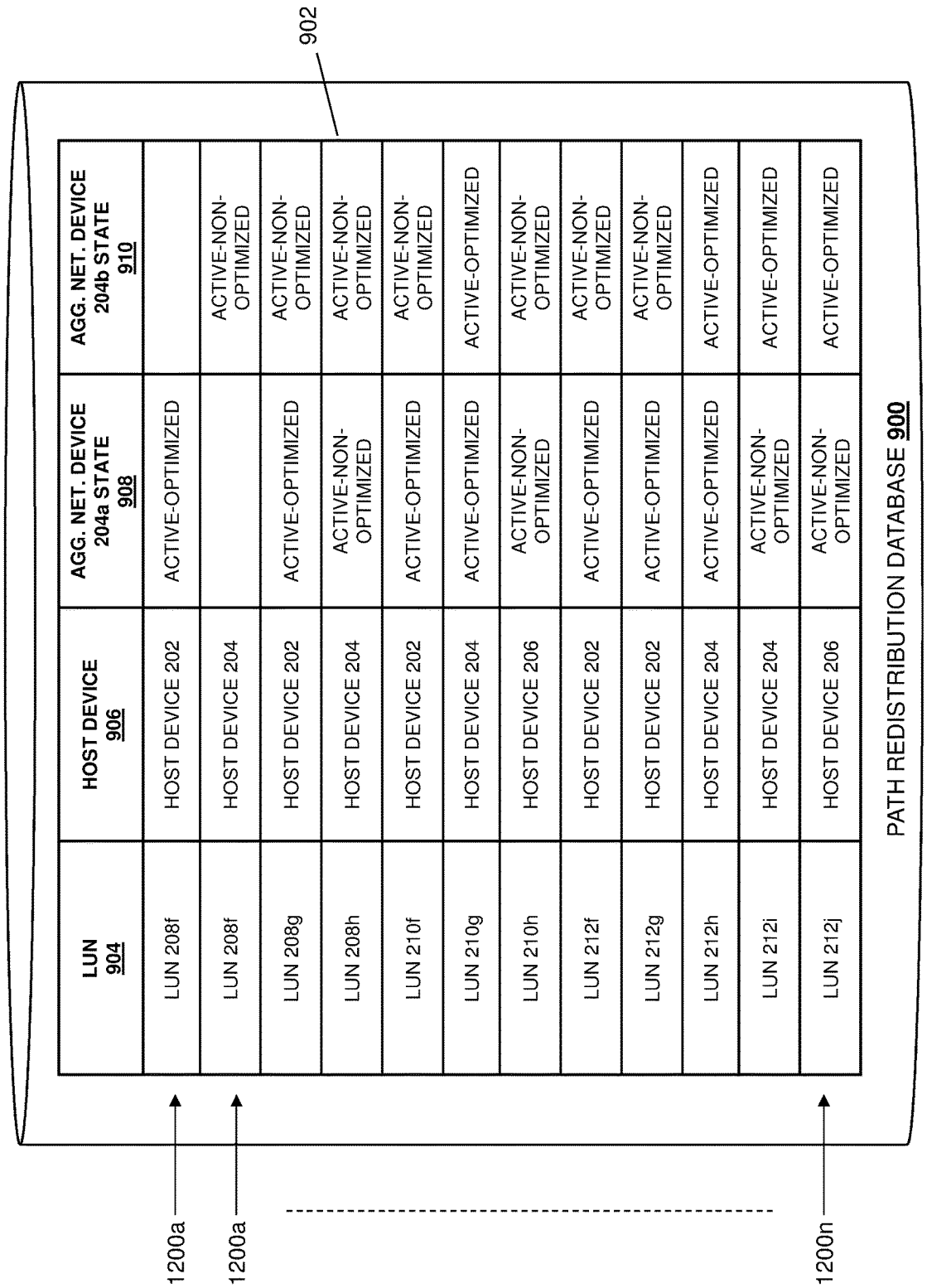
FIG. 12 is a schematic view illustrating an embodiment of a database that may be provided in the aggregated networking device of FIG. 3 in the ALUA path distribution system of FIG. 2 during the method of FIG. 4.

Referring now to FIG. 11, the ALUA path distribution system 200 of FIG. 5 is illustrated with the port 202b on the host device 202 having failed, "gone down", or otherwise having become unavailable, and with the port 20\4a on the host device 204 having failed, "gone down", or otherwise having become unavailable. In such an embodiment, the aggregated networking devices 204a and 204b may operate according to the method 400 in substantially the same manner discussed above in order to generate the path distribution table 902 with the path distribution entries 1200a, 1200b, and up to 1200n, illustrated in FIG. 12. As will be appreciated by one of skill in the art in possession of the present disclosure, the path distribution entry 1200a identifies the LUN 208f on the storage subsystem 208 in the LUN column 904, the host device 202 in the host device column 206, an active-optimized state for the aggregated networking device 204a that indicates that the aggregated networking device 204a provides an active-optimized path between the host device 202 and the LUN 208f, and no designation for the aggregated networking device 204b that indicates that the aggregated networking device 204b does not provide a path between the host device 202 and the LUN 208f (e.g., due to the unavailability of the port 202b.) Similarly, the path distribution entry 1200b identifies the LUN 208f on the storage subsystem 208 in the LUN column 904, the host device 204 in the host device column 206, no designation for the aggregated networking device 204a that indicates that the aggregated networking device 204a does not provide a path between the host device 204 and the LUN 208f (e.g., due to the unavailability of the port 204a), and an active-non-optimized state for the aggregated networking device 204b that indicates that the aggregated networking device 204b provides an active-non-optimized path between the host device 204 and the LUN 208f. As such, in this example, both of the host devices 202 and 204 utilize the LUN 208f.

In such a situation, while the ALUA path distribution engine 304 in the aggregated networking device 204a/300 may determine that the aggregated networking device 204a provides seven active-optimized paths versus four active-optimized paths provided by the aggregated networking device 204b, it may also recognize that only one path is provided between each of the host devices 202 and 204 and the LUN 208f (i.e., the active-optimized path provided by the aggregated networking device 204a between the host device 202 and the LUN 208f, and the active-non-optimized path provided by the aggregated networking device 204b between the host device 204 and the LUN 208f), and may ensure that the LUN 208f is not selected for rebalancing within the storage subsystem 208. As will be appreciated by one of skill in the art in possession of the present disclosure, rebalancing of the LUN 208f in the storage subsystem 208 in such a scenario could lead to "path thrashing", which is a situation where LUNs are continuously reassigned between storage controllers. As such, the aggregated networking devices 204a and 204b may be configured to recognize when particular LUNs should not be rebalanced in order to redistribute active-optimized paths between them.

Thus, systems and methods have been described that utilize a "big picture" view of the active-optimized path distribution between end devices that is available to the aggregated switch devices in an ALUA system, along with a feedback mechanism between the aggregated switch devices and server devices, in order to efficiently distribute active-optimized paths between the aggregated switch devices. For example, aggregated switch devices in an ALUA system may snoop communications between the server devices and the storage subsystems in that ALUA system, and a management server device may synchronize any snooped information between the aggregated switch devices. This allows the aggregated switch devices to use the snooped information to build a path distribution table that identifies each active-optimized path provided by the aggregated switch devices between server devices and Logical Unit Numbers (LUNs) included on the storage subsystems. Any aggregated switch device may then use the path distribution table to determine that an active-optimized path that it provides should be redistributed to being provided by another aggregated switch device and, in response, cause a server device that utilizes that active-optimized path to communicate with a storage subsystem to remap a LUN accessed via that active-optimized path such that that active-optimized path is redistributed and provided by the other aggregated switch device. As such, aggregated switch devices may be utilized more efficiently than in conventional ALUA systems Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Asymmetric Logical Unit Access (ALUA) path distribution system, comprising:
 a plurality of host devices;
 a plurality of storage subsystems;
 a management server device;
 a second aggregated networking device that is coupled to the management server device and that couples the plurality of host devices to the plurality of storage subsystems; and
 a first aggregated networking device that is coupled to the management server device and that couples the plurality of host devices to the plurality of storage subsystems, wherein the first aggregated networking device includes a processor that is configured to:
  snoop communications between the plurality of host devices and the plurality of storage subsystems to identify first snooped information;
  receive, from the management server device, second snooped information identified by the second aggregated networking device;
  build, using the first snooped information and the second snooped information, a path distribution table that identifies:
   each active-optimized path provided by the first aggregated networking device and the second aggregated networking device between the plurality of host devices and respective Logical Unit Numbers (LUNs) included on the plurality of storage subsystems; and
  determine, using the path distribution table, that a first active-optimized path should be redistributed from being provided by the first aggregated networking device to being provided by the second aggregated networking device and, in response, cause a first host device that utilizes the first active-optimized path to communicate with a first storage subsystem to remap a first LUN accessed via the first active-optimized path such that that first active-optimized path is provided by the second aggregated networking device.

2. The system of claim 1, wherein snooped communications between the plurality of host devices and the plurality of storage subsystems include LUN-specific inquiry communications and Report Target Port Group (RTPG) communications.

3. The system of claim 1, wherein the causing the first host device that utilizes the first active-optimized path to communicate with the first storage subsystem to remap the first LUN accessed via the first active-optimized path such that that first active optimized path is provided by the second aggregated networking device includes:
 transmitting, to the host device, a LUN identifier for the first LUN along with an instruction to cause storage controller ownership of the first LUN to be changed.

4. The system of claim 1, wherein the first aggregated networking device is configured to:
 identify that a second active-optimized path is the only path available between a second host device and a second LUN and, in response, determine that the second active-optimized path should not be redistributed from being provided by the first aggregated networking device to being provided by the second aggregated networking device.

5. The system of claim 1, wherein the determining that the first active-optimized path should be redistributed from being provided by the first aggregated networking device to being provided by the second aggregated networking device includes:
 determining, using the path distribution table, that the first aggregated networking device provides at least two more active-optimized paths than the second aggregated networking device.

6. The system of claim 1, wherein the first aggregated networking device is configured to:
 build, using the first snooped information and the second snooped information, the path distribution table that identifies:
  each active-non-optimized path provided by the first aggregated networking device and the second aggregated networking device between one of the plurality of host devices and respective Logical Unit Numbers (LUNs) included on the plurality of storage subsystems.

7. An Information Handling System (IHS), comprising:
 a processing system; and
 a memory system that is coupled to the processing system and that includes instructions that, when executed by the processing system, cause the processing system to provide a path distribution engine that is configured to:
  snoop communications between a plurality of host devices and a plurality of storage subsystems to identify first snooped information;
  receive, from a management server device that is coupled to the processing system, second snooped information identified by an aggregated networking device that is coupled to the management server device;

build, using the first snooped information and the second snooped information, a path distribution table that identifies:

each active-optimized path provided by the processing system and a second aggregated networking device between the plurality of host devices and respective Logical Unit Numbers (LUNs) included on the plurality of storage subsystems; and determine, using the path distribution table, that a first active-optimized path should be redistributed from being provided by the processing system to the being provided by aggregated networking device and, in response, cause a first host device that utilizes the first active-optimized path to communicate with a first storage subsystem to remap a first LUN accessed via the first active-optimized path such that that first active optimized path is provided by the aggregated networking device.

8. The IHS of claim 7, wherein snooped communications between the plurality of host devices and the plurality of storage subsystems include LUN-specific inquiry communications and Report Target Port Group (RTPG) communications.

9. The IHS of claim 7, wherein the causing the first host device that utilizes the first active-optimized path to communicate with the first storage subsystem to remap the first LUN accessed via the first active-optimized path such that that first active optimized path is provided by the aggregated networking device includes:

transmitting, to the host device, a LUN identifier for the first LUN along with an instruction to cause storage controller ownership of the first LUN to be changed.

10. The IHS of claim 7, wherein the path distribution engine is configured to:

identify that a second active-optimized path is the only path available between a second host device and a second LUN and, in response, determine that the second active-optimized path should not be redistributed from being provided by the processing system to being provided by the aggregated networking device.

11. The IHS of claim 7, wherein the determining that the first active-optimized path should be redistributed from being provided by the processing system to being provided by the aggregated networking device includes:

determining, using the path distribution table, that the processing system provides at least two more active-optimized paths than the aggregated networking device.

12. The IHS of claim 7, wherein the path distribution engine is configured to:

build, using the first snooped information and the second snooped information, the path distribution table that identifies:

each active-non-optimized path provided by the processing system and the aggregated networking device between one of the plurality of host devices and respective Logical Unit Numbers (LUNs) included on the plurality of storage subsystems.

13. The IHS of claim 7, wherein the determining that the first active-optimized path should be redistributed from being provided by the processing system to the being provided by aggregated networking device includes:

displaying information associated with each active-optimized path provided by the processing system and the aggregated networking device between one of the plurality of host devices and respective LUNs included on the plurality of storage subsystems; and receiving, subsequent to the displaying, a command to redistribute the first active-optimized path from being provided by the processing system to the being provided by the aggregated networking device.

14. A method for distributing paths, comprising:

snooping, by a first aggregated networking device, communications between a plurality of host devices and a plurality of storage subsystems to identify first snooped information;

receiving, by the first aggregated networking device from a management server device, second snooped information identified by a second aggregated networking device that is coupled to the management server device;

building, by the first aggregated networking device using the first snooped information and the second snooped information, a path distribution table that identifies:

each active-optimized path provided by the first aggregated networking device and the second aggregated networking device between the plurality of host devices and respective Logical Unit Numbers (LUNs) included on the plurality of storage subsystems; and determining, by the first aggregated networking device using the path distribution table, that a first active-optimized path should be redistributed from being provided by the first aggregated networking device to the being provided by second aggregated networking device and, in response, causing a first host device that utilizes the first active-optimized path to communicate with a first storage subsystem to remap a first LUN accessed via the first active-optimized path such that that first active optimized path is provided by the second aggregated networking device.

15. The method of claim 14, wherein snooped communications between the plurality of host devices and the plurality of storage subsystems include LUN-specific inquiry communications and Report Target Port Group (RTPG) communications.

16. The method of claim 14, wherein the causing the first host device that utilizes the first active-optimized path to communicate with the first storage subsystem to remap the first LUN accessed via the first active-optimized path such that that first active optimized path is provided by the second aggregated networking device includes:

transmitting, by the first aggregated networking device to the host device, a LUN identifier for the first LUN along with an instruction to cause storage controller ownership of the first LUN to be changed.

17. The method of claim 14, further comprising:

identifying, by the first aggregated networking device, that a second active-optimized path is the only path available between a second host device and a second LUN and, in response, determine that the second active-optimized path should not be redistributed from being provided by the first aggregated networking device to being provided by the second aggregated networking device.

18. The method of claim 14, wherein the determining that the first active-optimized path should be redistributed from being provided by the first aggregated networking device to being provided by the second aggregated networking device includes:

determining, using the path distribution table, that the first aggregated networking device provides at least two more active-optimized paths than the second aggregated networking device.

19. The method of claim 14, further comprising:
building, by the first aggregated networking device using the first snooped information and the second snooped information, the path distribution table that identifies:
each active-non-optimized path provided by the first aggregated networking device and the second aggregated networking device between one of the plurality of host devices and respective Logical Unit Numbers (LUNs) included on the plurality of storage subsystems.

20. The method of claim 14, wherein the determining that the first active-optimized path should be redistributed from being provided by the first aggregated networking device to the being provided by second aggregated networking device includes:
displaying, by first aggregated networking device, information associated with each active-optimized path provided by the first aggregated networking device and the second aggregated networking device between one of the plurality of host devices and respective LUNs included on the plurality of storage subsystems; and
receiving, first aggregated networking device subsequent to the displaying, a command to redistribute the first active-optimized path from being provided by the first aggregated networking device to the being provided by the second aggregated networking device.

* * * * *